US012727055B2

(12) United States Patent
Babaei

(10) Patent No.: US 12,727,055 B2
(45) Date of Patent: Sep. 1, 2026

(54) MULTICAST BROADCAST SERVICES NOTIFICATION AND OPERATION IN INACTIVE STATE

(71) Applicant: TOYOTA JIDOSHA KABUSHIKI KAISHA, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 18/290,487

(22) PCT Filed: May 11, 2022

(86) PCT No.: PCT/US2022/028761
§ 371 (c)(1),
(2) Date: Nov. 14, 2023

(87) PCT Pub. No.: WO2022/240984
PCT Pub. Date: Nov. 17, 2022

(65) Prior Publication Data

US 2024/0260134 A1 Aug. 1, 2024

Related U.S. Application Data

(60) Provisional application No. 63/188,905, filed on May 14, 2021.

(51) Int. Cl.
*H04W 76/40* (2018.01)
*H04W 68/02* (2009.01)

(52) U.S. Cl.
CPC .......... *H04W 76/40* (2018.02); *H04W 68/02* (2013.01)

(58) Field of Classification Search
CPC ..... H04W 76/40; H04W 68/02; H04W 48/20; H04W 76/27; H04W 60/04; H04W 4/06
See application file for complete search history.

(56) References Cited

U.S. PATENT DOCUMENTS 6,771,670 B1 8/2004 Pfahler
11,178,678 B2 * 11/2021 Dinan .............. H04W 72/0453
(Continued)

FOREIGN PATENT DOCUMENTS

CN 111294789 A 6/2020
EP 2389034 B1 3/2011
(Continued)

OTHER PUBLICATIONS

Santiago, Adrian, et al. "Analysis of mission critical services radio access network capacity limitations over 5G." IEEE Access 12 (2024): 6191-6203. (Year: 2024).*
(Continued)

*Primary Examiner* — Sharad Rampuria
(74) *Attorney, Agent, or Firm* — Finnegan, Henderson, Farabow, Garrett and Dunner, LLP

(57) ABSTRACT

A method of multicast broadcast services (MBS) notification signaling includes determining, by a user equipment (UE), paging occasions for monitoring a downlink control channel associated with one or more paging messages comprising one or more MBS-related notifications that are associated with scheduling information for reception of MBS data; receiving the one or more MBS-related notifications based on monitoring the downlink control channel in one or more first paging occasions of the paging occasions; and receiving the MBS data based on the one or more MBS-related notifications.

11 Claims, 21 Drawing Sheets

(56) References Cited

U.S. PATENT DOCUMENTS

| | | | | |
|---|---|---|---|---|
| 2010/0266063 | A1 | 10/2010 | Harel | |
| 2017/0303157 | A1 | 10/2017 | Siomina | |
| 2018/0035340 | A1 | 2/2018 | Fujishiro et al. | |
| 2019/0182632 | A1* | 6/2019 | Fujishiro | H04W 48/16 |
| 2019/0386771 | A1 | 12/2019 | Liu | |
| 2020/0077458 | A1 | 3/2020 | Stauffer | |
| 2020/0091978 | A1 | 3/2020 | Noh | |
| 2020/0229134 | A1 | 7/2020 | Tang | |
| 2020/0350969 | A1 | 11/2020 | Shimezawa | |
| 2020/0396591 | A1 | 12/2020 | Ou | |
| 2020/0413301 | A1 | 12/2020 | Shi | |
| 2021/0051505 | A1 | 2/2021 | Xu | |
| 2021/0099324 | A1 | 4/2021 | Choi | |
| 2021/0105055 | A1 | 4/2021 | Chae | |
| 2021/0259040 | A1 | 8/2021 | Babaei | |
| 2021/0274525 | A1 | 9/2021 | Wei | |
| 2021/0410180 | A1 | 12/2021 | Tsai | |
| 2022/0060923 | A1 | 2/2022 | Zheng | |
| 2022/0303945 | A1 | 9/2022 | Tsuda | |
| 2023/0097512 | A1* | 3/2023 | Yao | H04L 5/0053 370/329 |
| 2023/0232430 | A1* | 7/2023 | Zhou | H04L 12/1868 370/312 |
| 2023/0308925 | A1 | 9/2023 | Hu et al. | |
| 2024/0073997 | A1* | 2/2024 | Fujishiro | H04W 76/40 |
| 2024/0114531 | A1* | 4/2024 | Wu | H04W 4/06 |
| 2024/0187824 | A1* | 6/2024 | Wu | H04W 4/06 |

FOREIGN PATENT DOCUMENTS

| | | | |
|---|---|---|---|
| EP | 3509343 | A1 | 1/2019 |
| JP | 2019-146215 | A | 8/2019 |
| JP | 2020-534721 | A | 11/2020 |
| JP | 2021-048570 | A | 3/2021 |
| WO | 2015169371 | A1 | 11/2015 |
| WO | 2016141514 | A1 | 9/2016 |
| WO | WO 2016/163547 | A1 | 10/2016 |
| WO | 2016196044 | A1 | 12/2016 |
| WO | 2017086843 | A1 | 5/2017 |
| WO | 2018142345 | A1 | 8/2018 |
| WO | 2020150952 | A1 | 7/2020 |
| WO | 2020167205 | A1 | 8/2020 |
| WO | 2020167747 | A1 | 8/2020 |
| WO | 2022180226 | A1 | 9/2020 |
| WO | WO 2020/180226 | A1 | 9/2020 |
| WO | 2020220233 | A1 | 11/2020 |
| WO | 2020247043 | A1 | 12/2020 |
| WO | 2021023280 | A1 | 2/2021 |
| WO | 2021033085 | A1 | 2/2021 |
| WO | 2021078357 | A1 | 4/2021 |
| WO | 2021098074 | A1 | 5/2021 |
| WO | 2021152405 | A1 | 8/2021 |
| WO | 2021163527 | A1 | 8/2021 |
| WO | 2021228406 | A1 | 11/2021 |
| WO | 2021242157 | A1 | 12/2021 |
| WO | 2022078804 | A1 | 4/2022 |
| WO | 2022082727 | A1 | 4/2022 |
| WO | WO 2023/244701 | A | 12/2023 |

OTHER PUBLICATIONS

Prasad, Athul, et al. "Physical layer enhancements for high-reliability multicast and broadcast services in 5G release-17." IEEE Communications Standards Magazine 8.1 (2024): 44-51. (Year: 2024).*

3GPP TSG-RAN WG2 Meeting #100, R2-17xxxxx, (Re-submission of R2-1710813), LG Electronics Inc., "Service based cell reselection", Nov. 27-Dec. 1, 2017.

3GPP TSG-RAN WG2 NR AH1807 Meeting, R2-1809865, vivo: "cell reselection priority for Inactive UE", Jul. 2-6, 2018.

3GPP TR 23.761 V1.3.0, Technical Specification Group Services and System Aspects; Study on system enablers for devices having multiple Universal Subscriber Identity Modules (USIM) (Release 17), Mar. 2021.

GPP TSG RAN Meeting #88-e; RP-201038; Revised Work Item on NR Multicast and Broadcast Services (2013); Huwai; Jun. 29, 2020.

3GPP TS 36.300; 3rd Generation Partnership Project; Technical Specification Group Radio Access Network; NR; Radio Resource Control (RRC) protocol specification (Release 16) (Jun. 2021).

3GPP TS 38.331;3rd Generation Partnership Project; Technical Specification Group Radio Access Network; NR; Medium Access Control (MAC) protocol specification (Release 16); (Dec. 2020).

3GPP TSG WG1 Meeting #103-E; Intel Corp., Sidelink Enhancements for UE Power Saving; R1-2008998; Oct. 26, 2020.

3GPP TSG RAN WG1 #106-e; Interdigital Inc.; Sidelink Resourse Allocation for Power Saving; R1-2108035; Aug. 16, 2021.

3GPP TSG RAN WG2 Meeting of #114-e; Report from email discussion [AT114-e][027][QoE] Start and Stop (Lenovo); May 19, 2021.

Scheffel, et al.; WSN Data Confidence Attribution Using Predictors; 2018 Eighth Latin American Symposium on Dependable Computing (LADC); 2018.

3GPP_TS_28_404; 3rd Generation Partnership Project; Technical Solution Group Services and System Aspects; Mar. 27, 2020.

3GPP TSG RAN WG2 Meeting # 114-e; Further Discussion on QoE Measurement Collection in NR Standalone; R2_2105214, May 19, 2021.

3GPP TSG RAN WG2 Meeting # 114; Change Request; R2_2106554; May 19, 2021.

3GPP TSG-RAN WG3 #112-e; ZTE, China Telecom; TP for TS 38.300 Introduce NR QoE; May 17, 2021.

3GPP TR 38.890; Apr. 2021; Study on NR QoE Management and Optimizations for Diverse Services; Release 17; Apr. 9, 2021.

3GPP TSG RAN WG1 #105-e; Feature Lead Summary # 5 on RAN basic functions for broadcast/multicast for UEs in RRC_IDLE/RRC_Inactive States; May 10, 2021.

3GPP YSG-RAN WG2 Meeting #112-e; Qualcomm;NR Multicast-Broadcast Services and Configuration for UEs in Different RRC States; R2_2009038; Nov. 2, 2020.

3GPP YSG-RAN WG2 Meeting #111 Electronic; Scope and Architecture Analysis of NR MBS; R2_2007442; Aug. 17, 2020.

3GPP TSG-RAN WG2 Meeting #113e; Futurewei; Discussion on NR MBS Solutions of Mode 2 Delivery; R2-2100631; Jan. 25, 2021.

3GPP TSG-RAN WG2 Meeting #114-e; MBA MAC Layer and Group Scheduling Aspects; R2-2104876; May 19, 2021.

3GPP TSG-RAN WG2 Meeting #113bis electronic; Discussion on QoE Measurement Pausing and Resuming; R2-2103146; Apr. 2021.

3GPP TSG RAN WG1 #102-e Meeting; On Basic Functions for Broadcast/Multicast for RRC_IDLE/RRC_Inactive UEs; R1-2006175; Aug. 17, 2020.

3GPP TR 23.757; Study on Architectural Enhancements for 5G Multicast-Broadcast Services (Release 17); Mar. 2021.

3GPP FSG-RAN WG2 Meeting #111 electronic; Overview of NR MBS; R2-20070033; Aug. 18, 2020.

3GPP TSG-RAN WG2 Meeting #113-bis-e; ZTE Corp.; Discussion on Pause/Resume NR QoE Reporting; R2-2104271; Apr. 12, 2021.

3GPP TSG-RAN WG2 Meeting 113bis-e; Multicast Session Reception in RRC Inactive; R2-2103907; Apr. 12, 2021.

3GPP TSG RAN WG1 #105-e; Intel Corp.; NR MBS Group Scheduling for RRC_Connected UEs; R1-2104928; May 19, 2021.

3GPP TSG-RAN WG2 Meeting #113bis Electronic; QoE Reporting Control by RAN Awareness on QoE Parameter; R2-2103556; Apr. 12, 2021.

3GPP TSG-RAN WG2 Meeting #112-e; ZTE; Discussion on QoE in NR; R2-2010476; Nov. 2, 2020.

3GPP TSG-RAN WG2 Meeting #112-e; Nokia; Analysis of Solutions for Paging Collision; R2-2009264; Nov. 2, 2020.

3GPP TSG RAN WG2 #113bis; Ericsson; Configuration and Reporting for QoE Management; R2-2103049; Apr. 12, 2021.

3GPP TSG-RAN WG2 Meeting #97; Change Request; R2-1702256; Feb. 13, 2017.

3GPP TSG RAN WG1 Meeting #92bis; Apple; Discussion on Beam Measurement and Reporting; R1-1804770; Apr. 16, 2018.

(56) References Cited

OTHER PUBLICATIONS

3GPP TSG-RAN #111-e Qualcomm summary of off line discussion Jan. 25-Feb. 4, 2021.
Notification of transmittal of the ISR and the WO of the ISA mailed Nov. 15, 2022 in PCT/US2022/026761.

* cited by examiner

| Logical channel \ Transport channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Logical channel \ Transport channel | UL-SCH | RACH |
|---|---|---|
| CCCH | X | |
| DCCH | X | |
| DTCH | X | |

FIG. 3B

| Logical channel \ Transport channel | SL-BCH | SL-SCH |
|---|---|---|
| SBCCH | X | |
| SCCH | | X |
| STCH | | X |

FIG. 3C

| Physical channel / Transport channel | PDSCH | PDCCH | PBCH |
|---|---|---|---|
| BCH | | | X |
| PCH | X | | |
| DL-SCH | X | | |

| Physical channel / Transport channel | PUSCH | PUCCH | PRACH |
|---|---|---|---|
| UL-SCH | X | | |
| RACH | | | X |

| Physical channel / Transport channel | PSSCH | PSCCH | PSFCH | PSBCH |
|---|---|---|---|---|
| SL-BCH | | | | X |
| SL-SCH | X | | | |

SDAP
PDCP
RLC
MAC
PHY
SDAP
PDCP
RLC
MAC
PHY
UE 125A
UE 125B

RRC
PDCP
RLC
MAC
PHY
RRC
PDCP
RLC
MAC
PHY
UE 125A
UE 125B

PC5-S
PDCP
RLC
MAC
PHY
PC5-S
PDCP
RLC
MAC
PHY
UE 125A
UE 125B

RRC
RLC
MAC
PHY
RRC
RLC
MAC
PHY
UE 125A
UE 125B

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

MULTICAST BROADCAST SERVICES NOTIFICATION AND OPERATION IN INACTIVE STATE

CROSS-REFERENCE TO RELATED APPLICATIONS

This application is a national stage application of PCT/US2022/28761, filed May 11, 2022 (the PCT application"), now filed in the United States under 35 USC § 371. The PCT application claims priority under 35 USC § 119(e) from U.S. Provisional Patent Application No. 63/188,905, filed on May 14, 2021 ("the provisional application"); the contents of each of the PCT application and the provisional patent application are incorporated herein by reference.

BACKGROUND OF THE INVENTION

The present invention is directed to 5G, which is the 5$^{th}$ generation mobile network. It is a new global wireless standard after 1G, 2G, 3G, and 4G networks. 5G enables networks designed to connect machines, objects and devices.

The invention is more specifically directed to multicast broadcast services (MBS) notification signaling, for example, by enhancing multicast broadcast services (MBS) notification and operation in a radio resource control (RRC) inactive state.

SUMMARY OF THE INVENTION

In an embodiment, the invention provides a method of multicast broadcast services (MBS) notification signaling, including determining, by a user equipment (UE), paging occasions for monitoring a downlink control channel associated with one or more paging messages comprising one or more MBS-related notifications that are associated with scheduling information for reception of MBS data; receiving the one or more MBS-related notifications based on monitoring the downlink control channel in one or more first paging occasions of the paging occasions; and receiving the MBS data based on the one or more MBS-related notifications.

The one or more multicast broadcast services (MBS)-related notifications may indicate a start time or an end time or an activation time or deactivation time of an MBS session, may indicate one or more MBS configuration parameters for reception of the MBS data and may indicate a change in MBS configuration. Preferably, the one or more multicast broadcast services (MBS) configuration parameters comprise semi-persistent scheduling (SPS) configuration parameters. For that matter, the change in multicast broadcast services (MBS) configuration comprise one or more of a change in multicast control channel (MCCH) configuration or a change in semi-persistent scheduling (SPS) configuration for MBS data reception. The one or more multicast broadcast services (MBS)-related notifications may comprise a version number or index associated with MBS configuration; and the change in MBS configuration may be based on a change in the version number or index.

The method may further include determining, by the user equipment (UE), the change in the multicast broadcast services (MBS) configuration based on the version number or the index. In this case, the user equipment (UE) may be in a radio resource control (RRC) connected state, or in a radio resource control (RRC) idle state. The one or more paging messages may derive from a core network (CN) initiated paging. The user equipment (UE) may be in a radio resource control (RRC) inactive state. For that matter, the one or more paging messages may derive from a radio access network (RAN) initiated paging.

The method may also include receiving a configuration parameter indicating a paging radio network temporary identifier (P-RNTI), wherein the downlink control channel is associated with the P-RNTI. Preferably, receiving the one or more paging messages is based on group paging. Also, the one or more paging messages are received by one or more further user equipments (UEs), and the one or more further UEs including the UE are scheduled to receive multicast broadcast services (MBS) data. Determining the paging occasions may be based on a discontinuous reception (DRX) procedure, or a user equipment (UE) identifier. In that case, the user equipment (UE) identifier can be a temporary mobile subscriber identity (TMSI). For that matter, determining the paging occasions may be based on an offset parameter received via a radio resource control (RRC) message or via a broadcast message.

The method may also include initiating a state transition in response to reception of the one or more multicast broadcast services (MBS)-related notifications. In that case, the state transition may comprise transitioning from a radio resource control (RRC) inactive state or RRC idle state to an RRC connected state. The initiating of the state transition may be based on one or more channel robustness conditions. The one or more channel robustness conditions may be based on a received signal received power (RSRP) or a received signal received quality (RSRQ) associated with one or more reference signals. The state transition may be based on a radio resource control (RRC) connection resume procedure or an RRC connection establishment procedure. Preferably, the one or more multicast broadcast services (MBS)-related notifications comprise a version number or index of MBS configuration; and the initiating of the state transition is based on the version number or the index. The initiating of the state transition may be based on the version number or the index changing compared to a current version number or index.

In an embodiment, the invention provides a method of multicast broadcast services (MBS) data reception in an inactive state. The method includes determining, by a user equipment (UE), to transition from a radio resource control (RRC) connected state to an RRC inactive state; determining an MBS zone associated with MBS data reception in an RRC inactive state; and receiving MBS data using first MBS configuration parameters, while the UE is in the MBS zone. The multicast broadcast services (MBS) zone may comprise one or more radio access network (RAN) notification areas (RNAs). The method may also include receiving a radio resource control (RRC) release message, wherein the determining to transition from the RRC connected state to the RRC inactive state is based on the RRC release message. For that matter, the radio resource control (RRC) release message comprises one or more information elements (IEs) indicating parameters associated with the multicast broadcast services (MBS) zone. Preferably, the one or more information elements (IEs) indicate identifiers of one or more cells or one or more radio access network (RAN) notification areas (RNAs) associated with the multicast broadcast services (MBS) zone.

The method also may include transitioning from the radio resource control (RRC) inactive state to the RRC connected state in response to reselecting a cell that is not in the multicast broadcast services (MBS) zone and may include receiving second multicast broadcast services (MBS) configuration parameters for MBS data reception in response to the transitioning from the RRC inactive state to the RRC connected state. The transitioning from the radio resource control (RRC) inactive state to the RRC connected state may be based on a random access process. The first configuration parameters may be associated with the multicast broadcast services (MBS) zone. The method may also include receiving a radio resource control (RRC) release message comprising the first configuration parameters associated with the multicast broadcast services (MBS) zone.

In an embodiment, the invention provides a user equipment (UE), with one or more processors; and memory storing instructions, that when executed by the one or more processors, cause the UE to: determine paging occasions for monitoring a downlink control channel associated with one or more paging messages comprising one or more multicast broadcast services (MBS)-related notifications that are associated with scheduling information for reception of MBS data; receive the one or more MBS-related notifications based on monitoring the downlink control channel in one or more first paging occasions of the paging occasions; and receive the MBS data based on the one or more MBS-related notifications. The one or more multicast broadcast services (MBS)-related notifications may indicate a start time or an end time or an activation time or deactivation time of an MBS session. The one or more multicast broadcast services (MBS)-related notifications may indicate one or more MBS configuration parameters for reception of the MBS data. The one or more multicast broadcast services (MBS) configuration parameters may comprise semi-persistent scheduling (SPS) configuration parameters. The one or more multicast broadcast services (MBS)-related notifications may indicate a change in MBS configuration.

Preferably, the change in multicast broadcast services (MBS) configuration comprises one or more of a change in multicast control channel (MCCH) configuration or a change in semi-persistent scheduling (SPS) configuration for MBS data reception. Preferably, the one or more multicast broadcast services (MBS)-related notifications comprise a version number or index associated with MBS configuration and the change in MBS configuration is based on a change in the version number or index. The instructions, when executed by the one or more processors, further cause the UE to determine the change in the multicast broadcast services (MBS) configuration based on the version number or the index. Preferably, the UE is in a radio resource control (RRC) connected state but may be in a radio resource control (RRC) idle state.

The one or more paging messages derive from a core network (CN) initiated paging. The one or more paging messages may derive from a radio access network (RAN) initiated paging. Preferably, the instructions, when executed by the one or more processors, further cause the UE to receive a configuration parameter indicating a paging radio network temporary identifier (P-RNTI), wherein the downlink control channel is associated with the P-RNTI. The receiving the one or more paging messages may be based on group paging. For that matter, the one or more paging messages are received by one or more further user equipments (UEs), and the one or more further UEs including the UE are scheduled to receive multicast broadcast services (MBS) data. Determining the paging occasions may be based on a discontinuous reception (DRX) procedure. Determining the paging occasions may be based on a user equipment (UE) identifier. The UE identifier may be a temporary mobile subscriber identity (TMSI). Determining the paging occasions may be based on an offset parameter received via a radio resource control (RRC) message or via a broadcast message.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
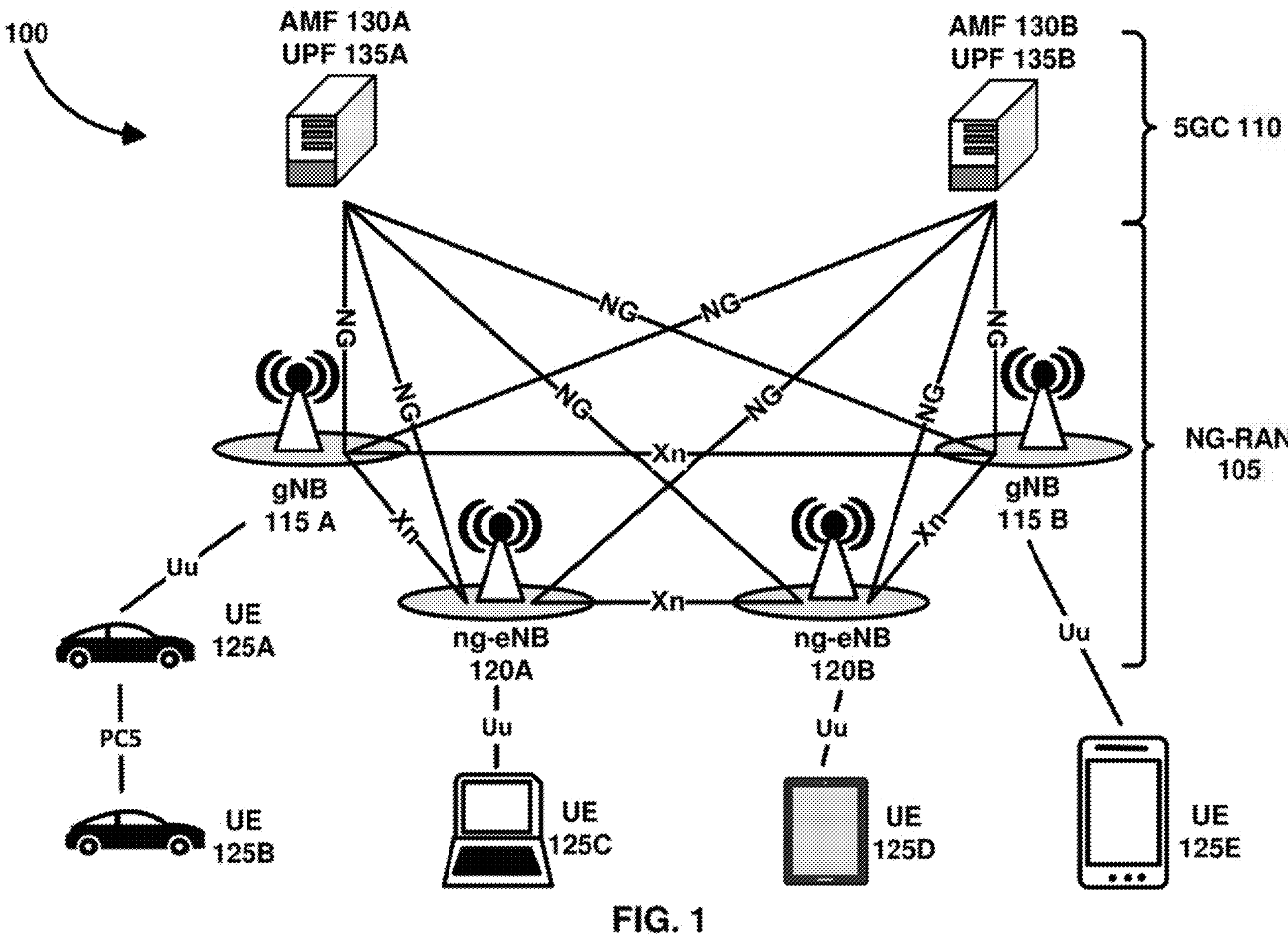
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIOT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
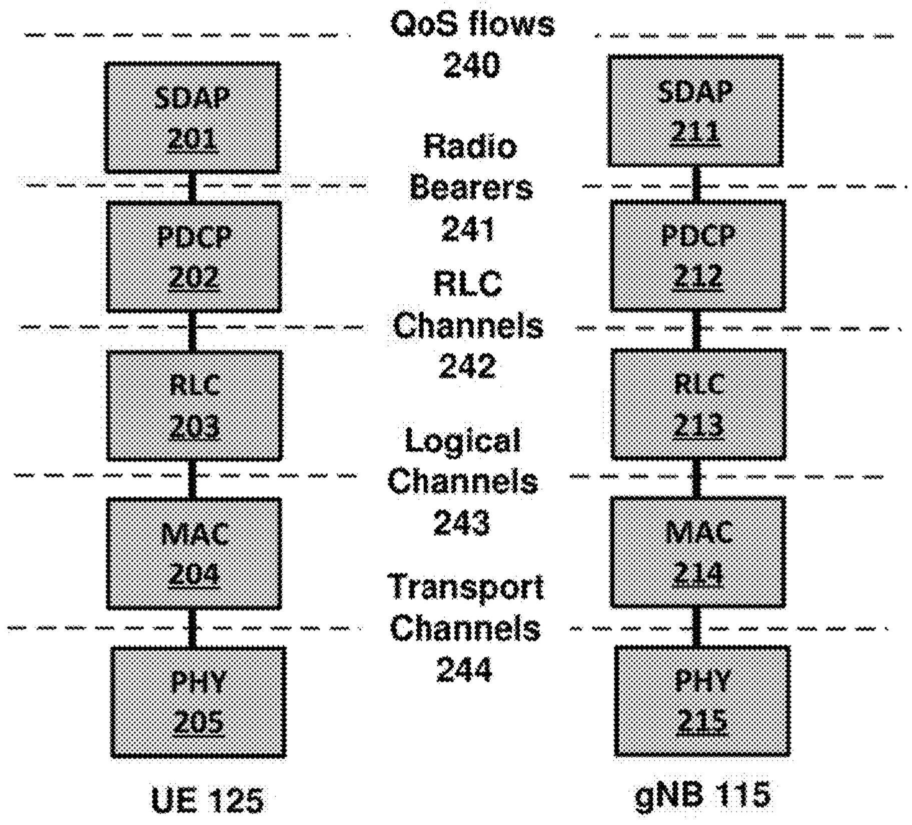
FIG. 2A and FIG. 2B show examples of radio protocol stacks for user plane and control plane, respectively, according to some aspects of some of various exemplary embodiments of the present disclosure.
Figure 2B:
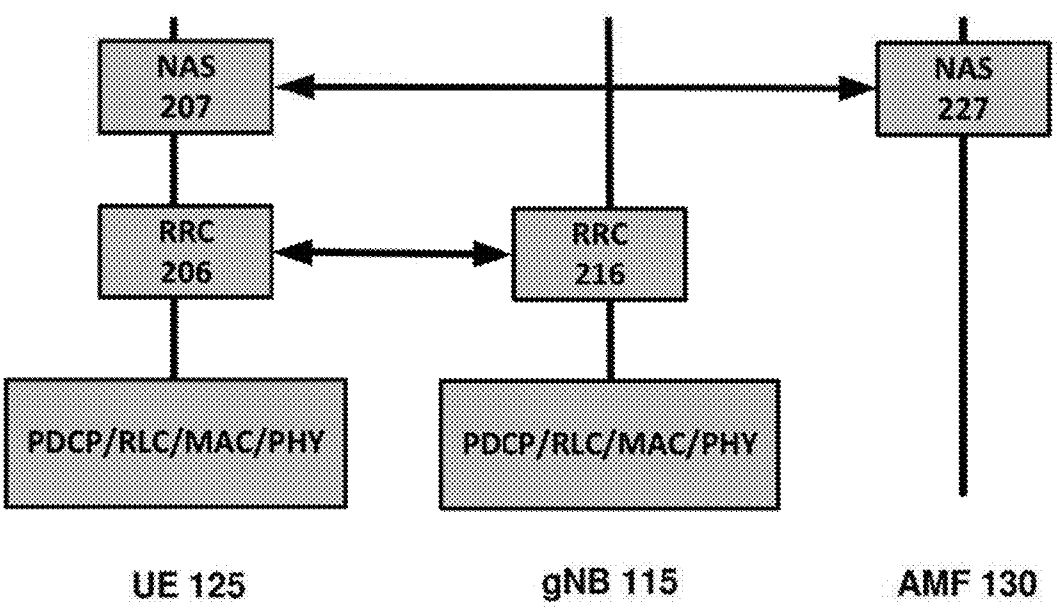

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by predefined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
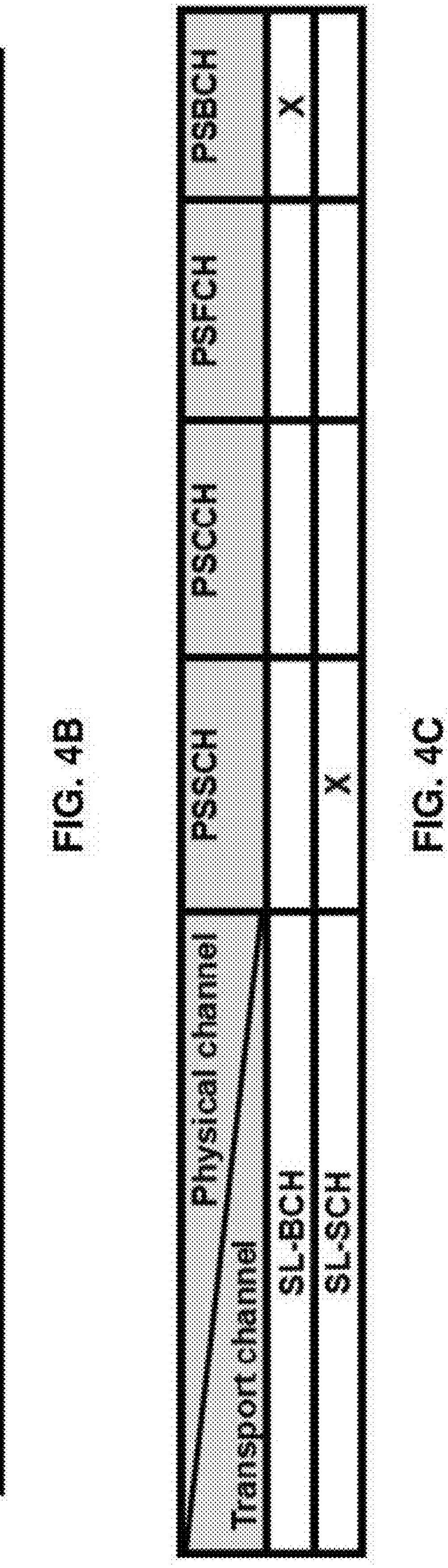
FIG. 4A, FIG. 4B and FIG. 4C show example mappings between transport channels and physical channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figures 5A, 5B, 5C, 5D:
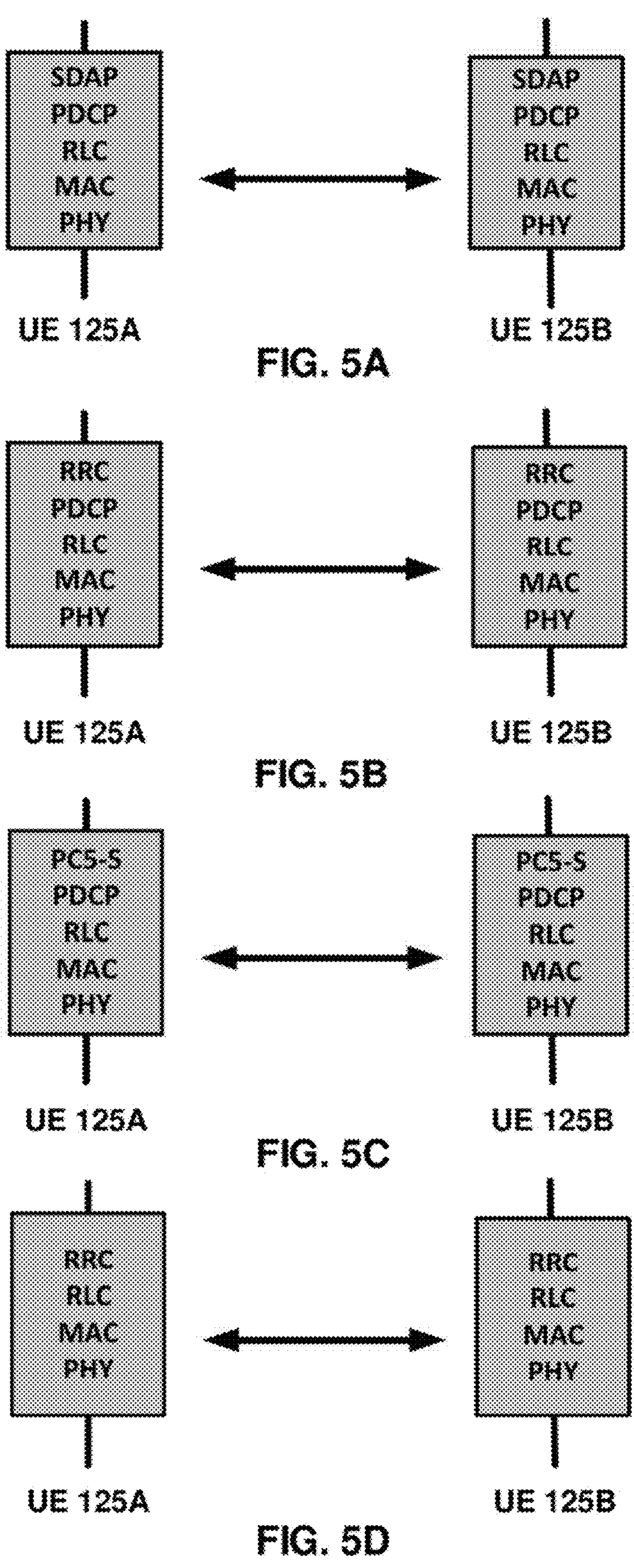
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
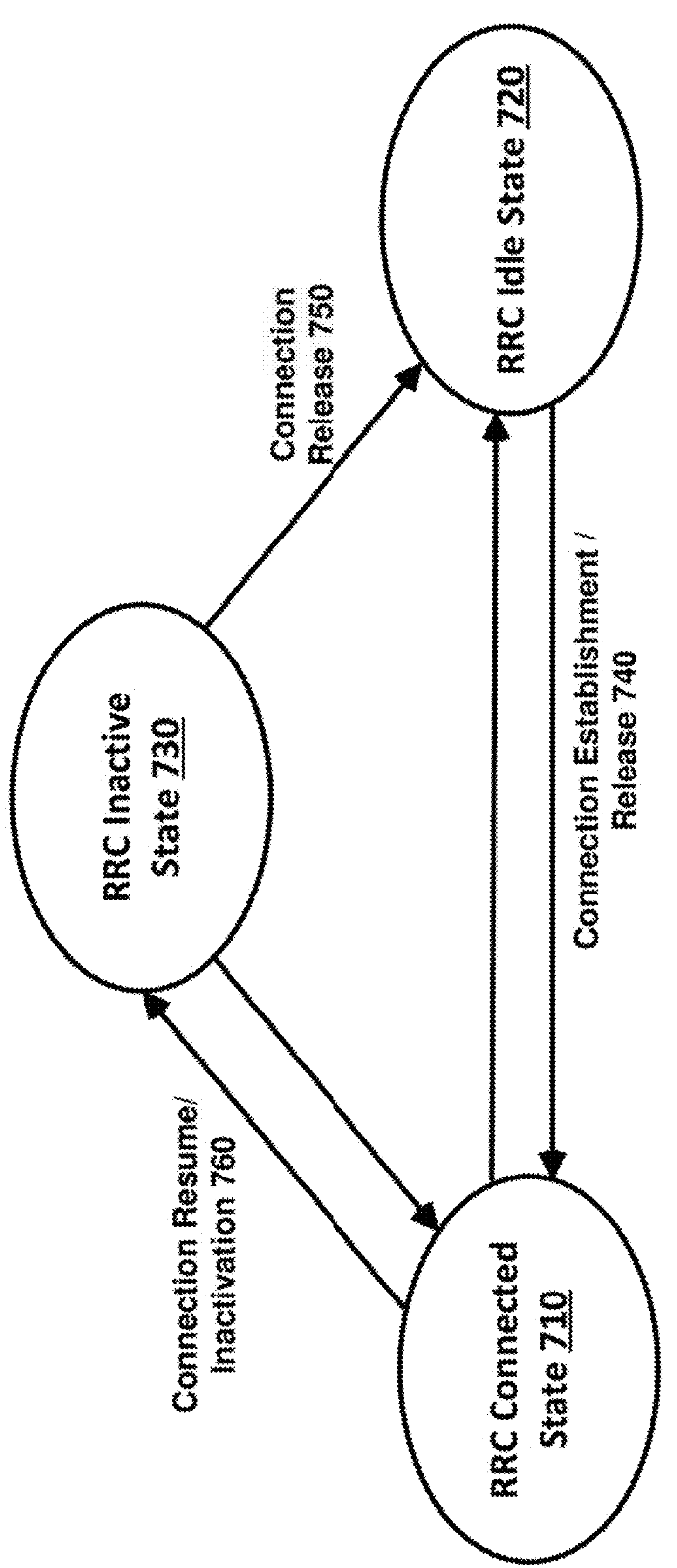
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
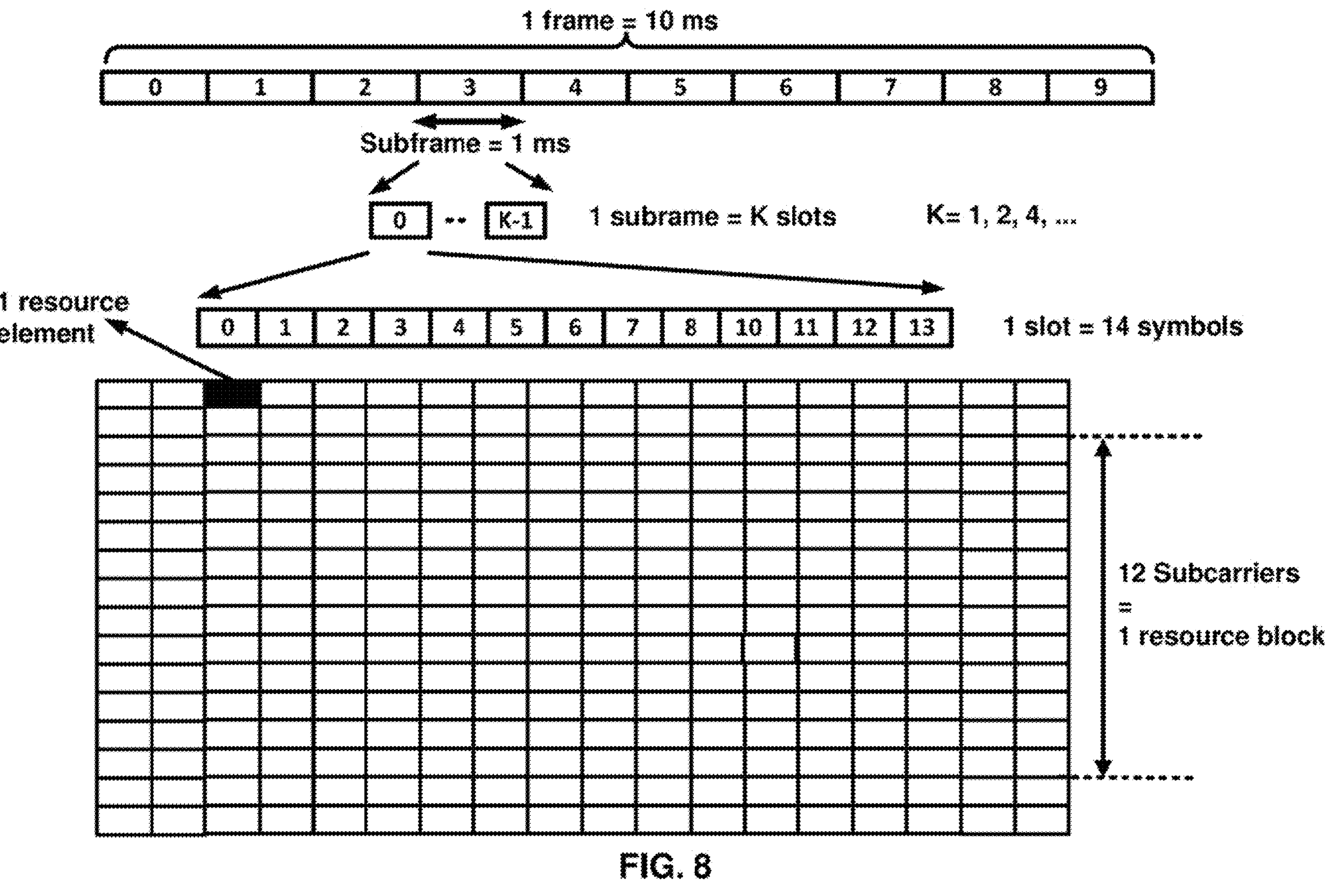
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
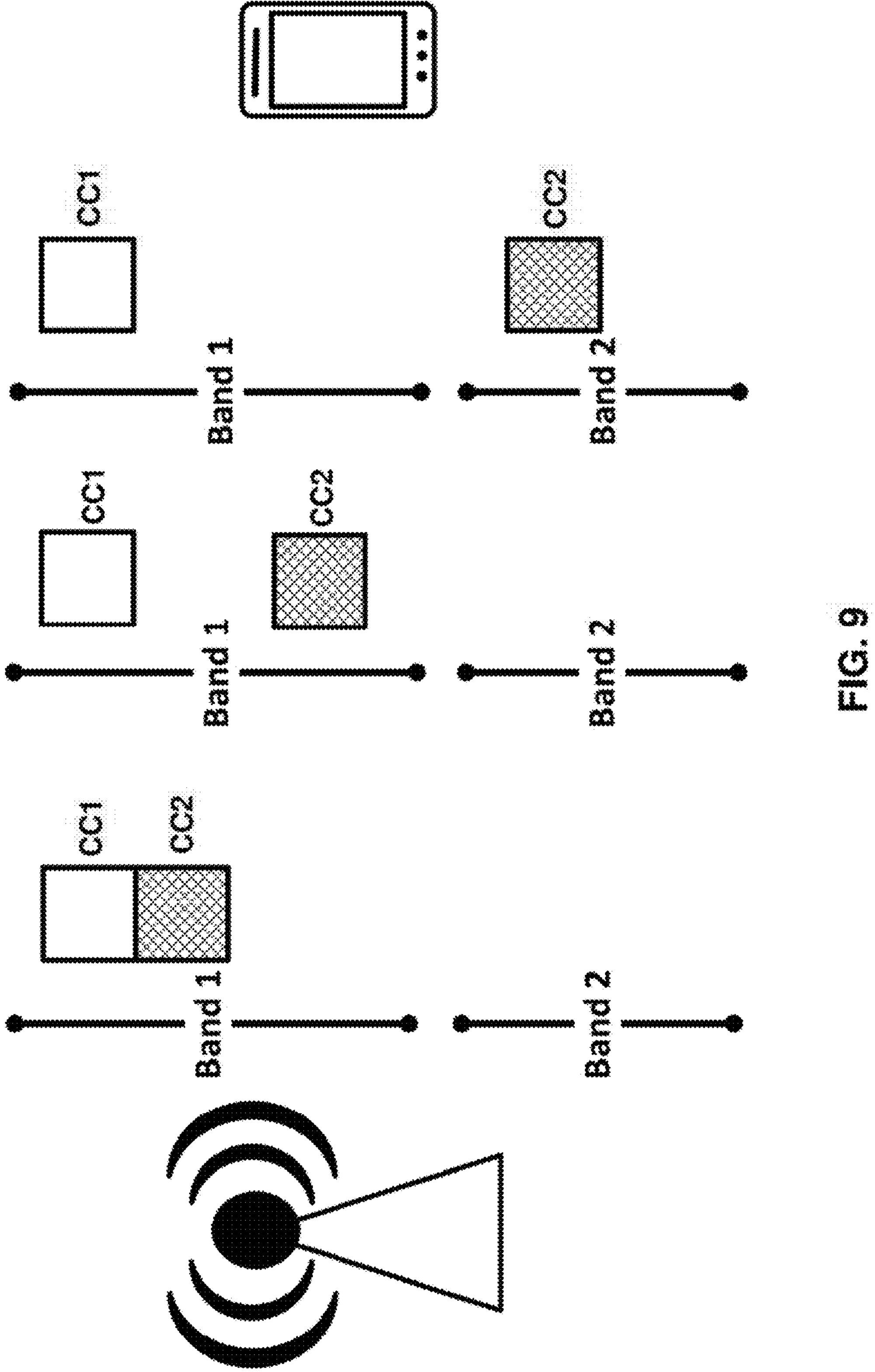
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
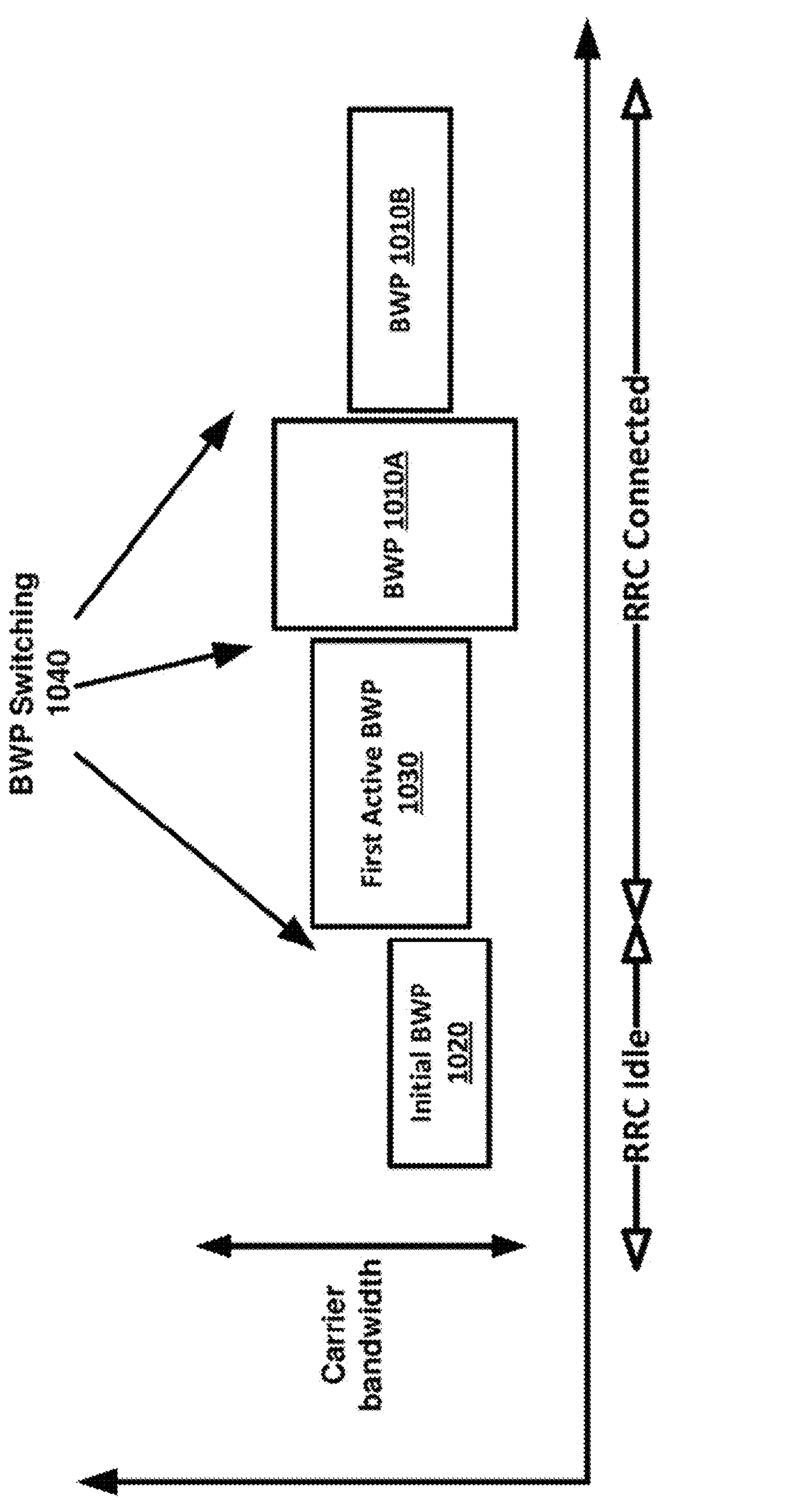
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
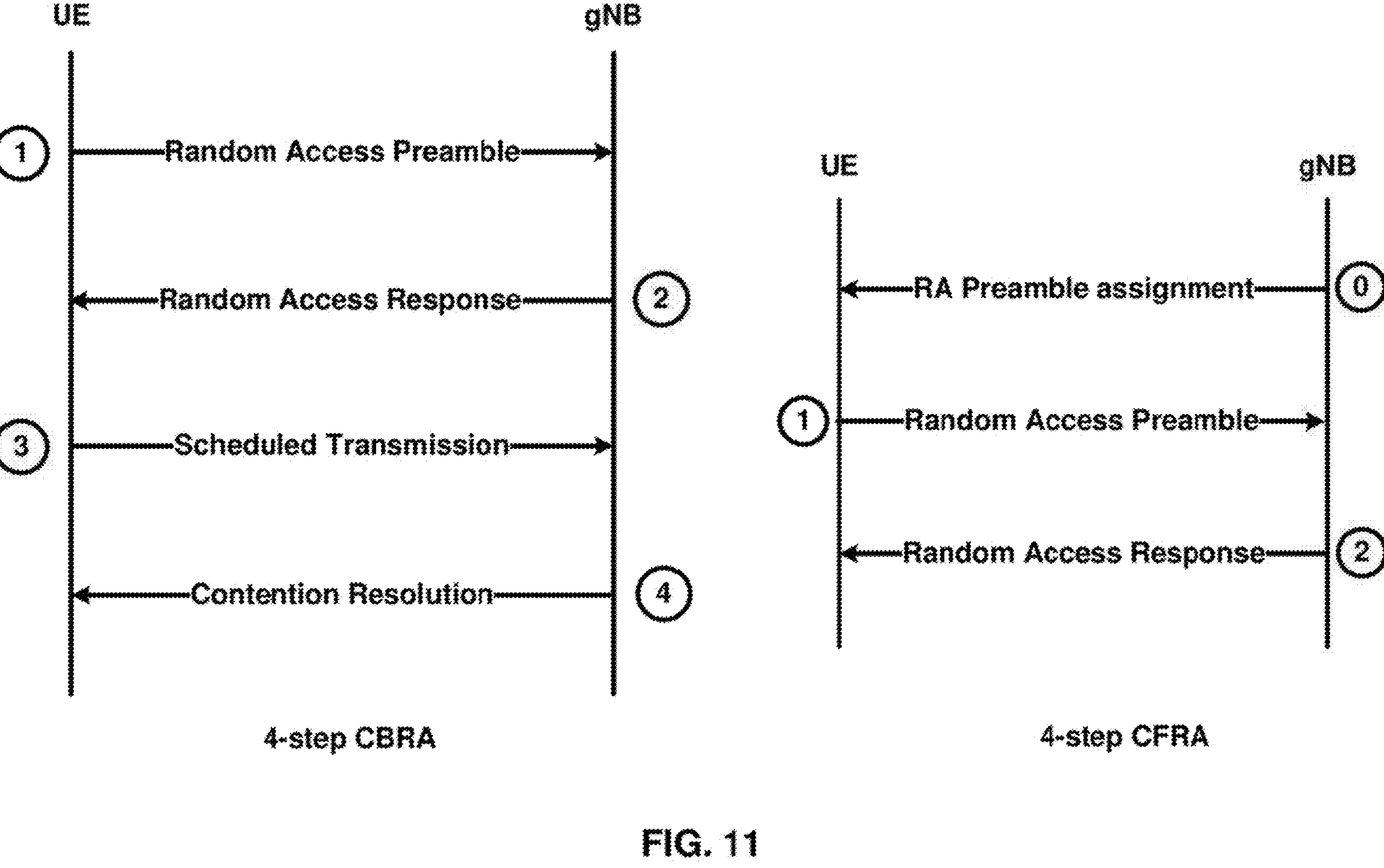
FIG. 11 shows example four-step contention-based and contention-free random access processes according to some aspects of some of various exemplary embodiments of the present disclosure.
Figure 12:
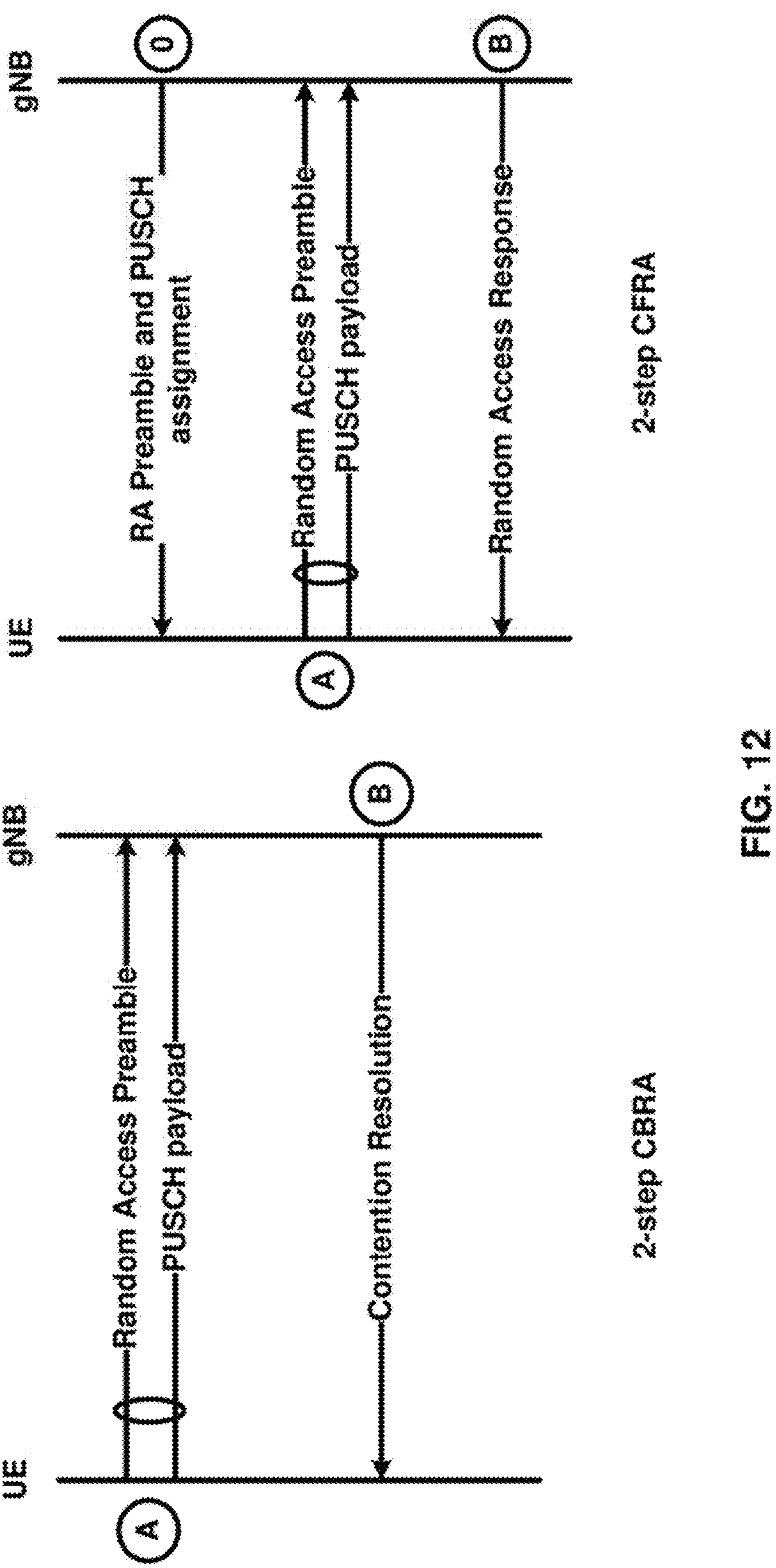
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
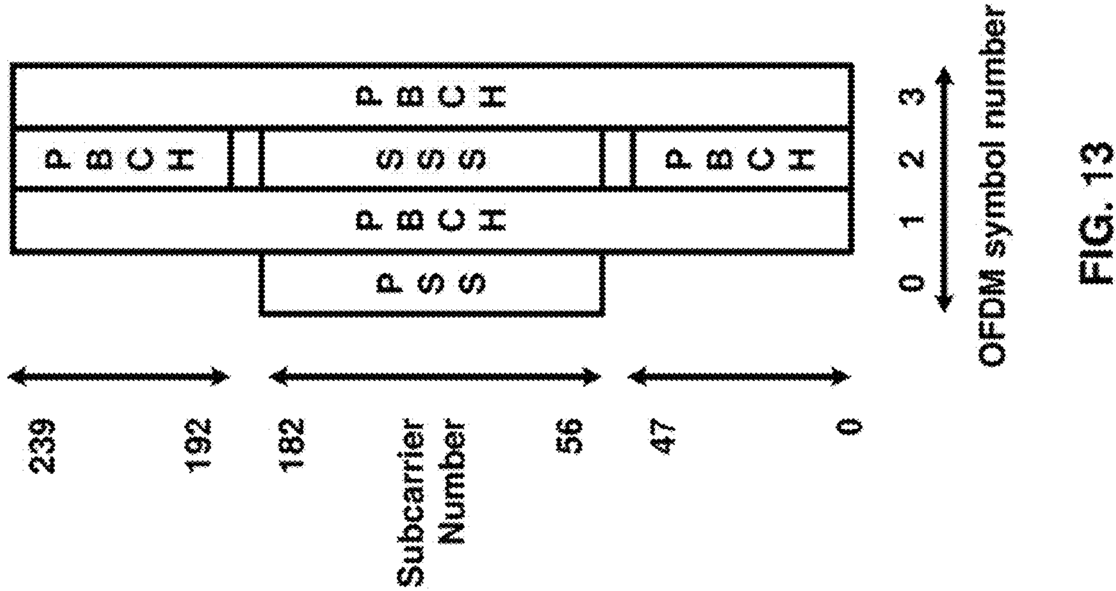
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
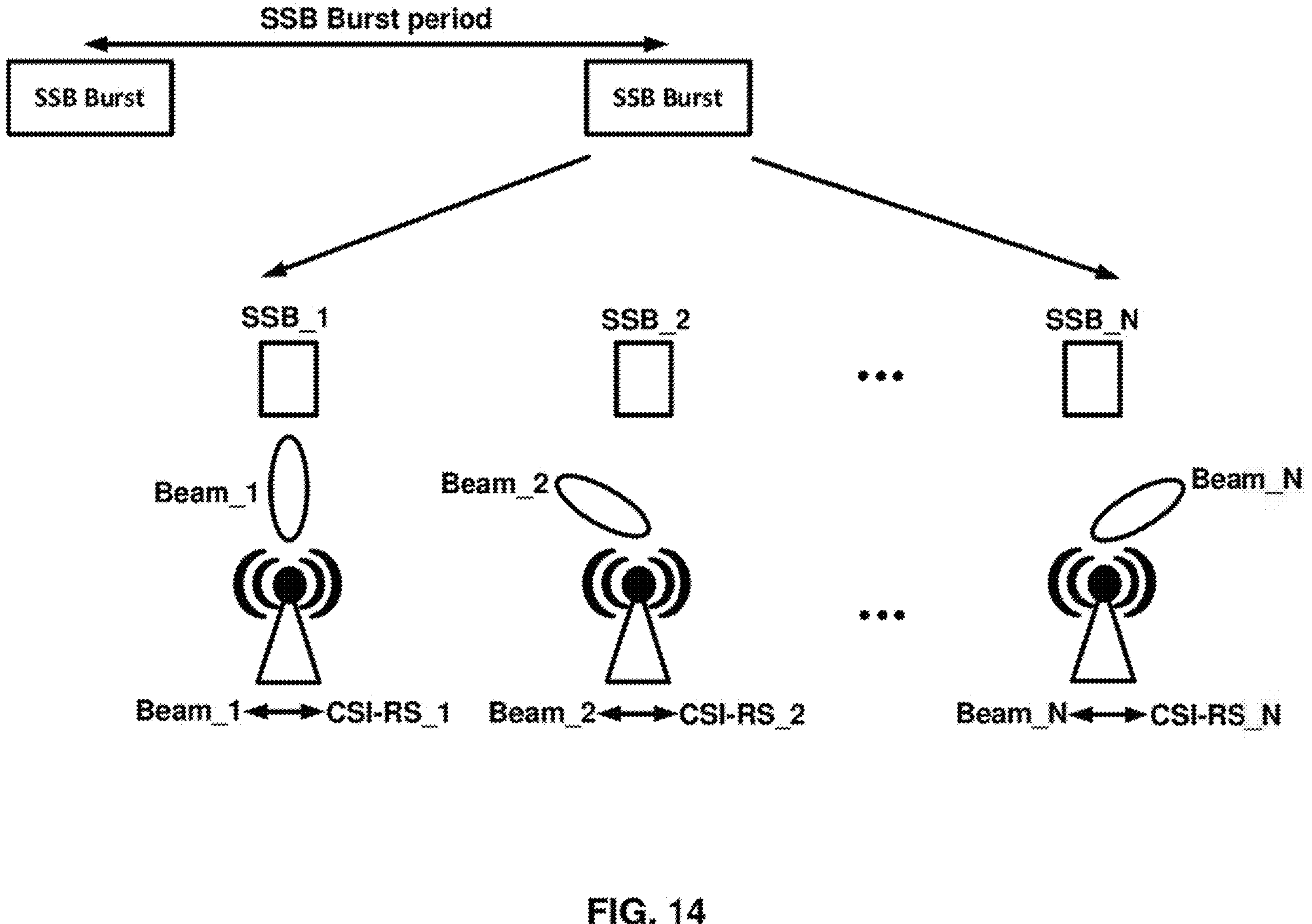
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
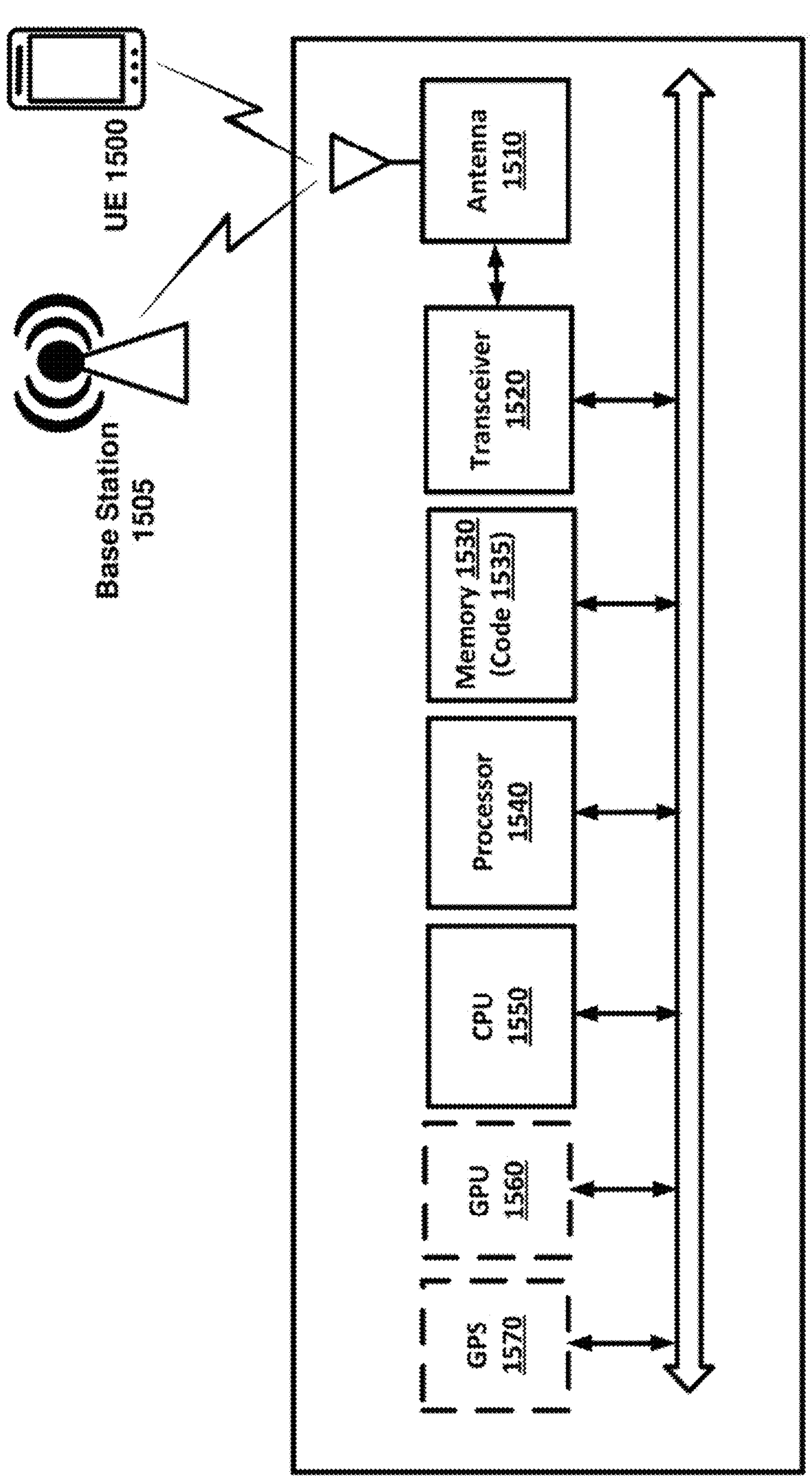
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, the UE may use Discontinuous Reception (DRX) in RRC_IDLE and RRC_INACTIVE state in order to reduce power consumption. The UE may monitor one paging occasion (PO) per DRX cycle. A PO may be a set of PDCCH monitoring occasions and may comprise of multiple time slots (e.g., subframe or OFDM symbol) where paging DCI may be sent. One Paging Frame (PF) may be one Radio Frame and may contain one or multiple PO(s) or starting point of a PO.

In some examples, in multi-beam operations, the UE may assume that the same paging message and the same Short Message may be repeated in transmitted beams. The selection of the beam(s) for the reception of the paging message and Short Message may be up to UE implementation. The paging message may be same for both RAN initiated paging and CN initiated paging.

In some examples, the UE may initiate RRC Connection Resume procedure upon receiving RAN initiated paging. If the UE receives a CN initiated paging in RRC_INACTIVE state, the UE may move to RRC_IDLE and informs NAS.

In some examples, the PF and PO for paging may be determined by the following formulae: SFN for the PF is determined by: (SFN+PF_offset) mod T=(T div N)*(UE_ID mod N); Index (i_s), indicating the index of the PO is determined by: i_s=floor (UE_ID/N) mod Ns.

In some examples, the PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for RMSI.

In some examples, when SearchSpaceId=0 is configured for pagingSearchSpace, Ns may be either 1 or 2. For Ns=1, there may be only one PO which may start from the first PDCCH monitoring occasion for paging in the PF. For Ns=2, PO may be either in the first half frame (i_s=0) or the second half frame (i_s=1) of the PF.

In some examples, when SearchSpaceId other than 0 is configured for pagingSearchSpace, the UE may monitor the (i_s+1)th PO. A PO may be a set of 'S*X' consecutive PDCCH monitoring occasions where 'S' is the number of actual transmitted SSBs determined according to ssb-PositionsInBurst in SIB1 and X may be the nrofPDCCH-MonitoringOccasionPerSSB-InPO if configured or may be equal to 1 otherwise. The [x*S+K]th PDCCH monitoring occasion for paging in the PO may correspond to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it may be equal to i_s*S*X. If X>1, when the UE detects a PDCCH transmission addressed to P-RNTI within its PO, the UE may not be required to monitor the subsequent PDCCH monitoring occasions for this PO.

In some examples, a PO associated with a PF may start in the PF or after the PF. In some examples, the PDCCH monitoring occasions for a PO may span multiple radio frames. When SearchSpaceId other than 0 is configured for paging-SearchSpace the PDCCH monitoring occasions for a PO may span multiple periods of the paging search space.

In some examples, the following parameters are used for the calculation of PF and i_s above: T: DRX cycle of the UE (T may be determined by the shortest of the UE specific DRX value(s), if configured by RRC and/or upper layers, and a default DRX value broadcast in system information. In RRC_IDLE state, if UE specific DRX is not configured by upper layers, the default value is applied); N: number of total paging frames in T; Ns: number of paging occasions for a PF; PF_offset: offset used for PF determination; UE_ID: 5G-S-TMSI mod 1024.

In some examples, parameters Ns, nAndPagingFrameOffset, nrofPDCCH-MonitoringOccasionPerSSB-InPO, and the length of default DRX Cycle may be signaled in SIB1. The values of N and PF_offset may be derived from the parameter nAndPagingFrameOffset. In some examples, the parameter first-PDCCH-MonitoringOccasionOfPO may be signalled in SIB1 for paging in initial DL BWP. For paging in a DL BWP other than the initial DL BWP, the parameter first-PDCCH-MonitoringOccasionOfPO may be signaled in the corresponding BWP configuration.

In some examples, if the UE has no 5G-S-TMSI, for instance when the UE has not yet registered onto the network, the UE may use as default identity UE_ID=0 in the PF and i_s formulas above.

In some examples, 5G-S-TMSI may be a 48 bit long bit string. 5G-S-TMSI may be in the formulae above be interpreted as a binary number where the left most bit represents the most significant bit.

In some examples, paging may allow the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH, but while the former may be sent on PCCH, the latter may be sent over PDCCH directly.

In some examples, while in RRC_IDLE the UE may monitor the paging channels for CN-initiated paging; in RRC_INACTIVE the UE may also monitor paging channels for RAN-initiated paging. A UE may not need monitor paging channels continuously; Paging DRX may be defined where the UE in RRC_IDLE or RRC_INACTIVE may be required to monitor paging channels during one Paging Occasion (PO) per DRX cycle. The Paging DRX cycles may configured by the network: 1) For CN-initiated paging, a default cycle may be broadcast in system information; 2) For CN-initiated paging, a UE specific cycle may be configured via NAS signalling; 3) For RAN-initiated paging, a UE-specific cycle may be configured via RRC signalling; The UE may use the shortest of the DRX cycles applicable e.g., a UE in RRC_IDLE may use the shortest of the first two cycles above, while a UE in RRC_INACTIVE may use the shortest of the three.

In some examples, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In some examples, when in RRC_CONNECTED, the UE may monitors the paging channels in a PO signalled in system information for SI change indication and PWS notification. In case of bandwidth adaptation (BA), a UE in RRC_CONNECTED may monitor paging channels on the active BWP with common search space configured.

In some examples, for operation with shared spectrum channel access, a UE may be configured for an additional number of PDCCH monitoring occasions in its PO to monitor for paging. However, when the UE detects a PDCCH transmission within the UE's PO addressed with P-RNTI, the UE may not be required to monitor the subsequent PDCCH monitoring occasions within this PO.

In some examples, the network may initiate the paging procedure by transmitting the Paging message at the UE's paging occasion. The network may address multiple UEs within a Paging message by including one PagingRecord for each UE.

In some examples, upon receiving the Paging message, if in RRC_IDLE, for each of the PagingRecord, if any, included in the Paging message: if the ue-Identity included in the PagingRecord matches the UE identity allocated by upper layers: the UE may forward the ue-Identity and accessType (if present) to the upper layers.

In some examples, if in RRC_INACTIVE, for each of the PagingRecord, if any, included in the Paging message: the ue-Identity included in the PagingRecord may match the UE's stored fullI-RNTI. If the UE is configured by upper layers with Access Identity 1: the UE may initiate the RRC connection resumption procedure with resumeCause set to mps-PriorityAccess. If the UE is configured by upper layers with Access Identity 2: the UE may initiate the RRC connection resumption procedure with resumeCause set to mcs-PriorityAccess. If the UE is configured by upper layers with one or more Access Identities equal to 11-15: the UE may initiate the RRC connection resumption procedure with resumeCause set to highPriorityAccess. Otherwise, the UE may initiate the RRC connection resumption procedure with resumeCause set to mt-Access.

In some examples, the UE may perform a RAN-based notification area update (RNAU) periodically or when the UE selects a cell that does not belong to the configured RNA.

In some examples, the RRCRelease message may be used to command the release of an RRC connection or the suspension of the RRC connection. In some examples, an IE suspendConfig may indicate configuration for the RRC_INACTIVE state. The network does not configure suspendConfig when the network redirect the UE to an inter-RAT carrier frequency or if the UE is configured with a DAPS bearer. In some examples, ran-PagingCycle may refer to the UE specific cycle for RAN-initiated paging. In some examples, t380 may refer to the timer that triggers the periodic RNAU procedure in UE. In some example, RAN-NotificationAreaInfo in the RRCRelease message may comprise a cellist field indicating a list of cells configured as RAN area. In some examples, ran-AreaConfigList may indicate a list of RAN area codes or RA code(s) as RAN area.

In some examples, an RRCResume message may be used to resume the suspended RRC connection.

In some examples, a group scheduling mechanism may be used to allow UEs (e.g., UEs in RRC Connected state) to receive Broadcast/Multicast service. In some examples, simultaneous operation with unicast reception may be enabled.

In some examples, Broadcast/Multicast service delivery may be dynamically changed between multicast (PTM) and unicast (PTP) with service continuity for a given UE.

In some examples, for broadcast/multicast operation may be provided for UEs in RRC_IDLE/RRC_INACTIVE states.

In an example, for point-to-point (PTP) transmission in multicast broadcast services (MBS), for RRC_CONNECTED UEs, UE-specific PDCCH with CRC scrambled by UE-specific RNTI (e.g., C-RNTI) may be used to schedule UE-specific PDSCH which may be scrambled with the same UE-specific RNTI.

In an example, for point-to-multipoint (PTM) transmission in MBS (e.g., PTM transmission scheme 1), for RRC_CONNECTED UEs in the same MBS group, group-common PDCCH with CRC scrambled by group-common RNTI may be used to schedule group-common PDSCH which may be scrambled with the same group-common RNTI. This scheme may also be called a group-common PDCCH based group scheduling scheme.

In an example, for point-to-multipoint (PTM) transmission in MBS (e.g., PTM transmission scheme 2), for RRC_CONNECTED UEs in the same MBS group, UE-specific PDCCH with CRC scrambled by UE-specific RNTI (e.g., C-RNTI) may be used to schedule group-common PDSCH which may be scrambled with group-common RNTI. This scheme may also be called a UE-specific PDCCH based group scheduling scheme.

In an example, the UE-specific PDCCH/PDSCH may indicate the PDCCH/PDSCH may only be identified by the target UE but may not be identified by the other UEs in the same MBS group with the target UE.

In an example, the group-common PDCCH/PDSCH may indicate the PDCCH/PDSCH may be transmitted in the same time/frequency resources and may be identified by all the UEs in the same MBS group.

In an example, for RRC_CONNECTED UEs, if initial transmission for multicast is based on PTM transmission scheme 1, at least retransmission(s) can use PTM transmission scheme 1 may be used. In an example, PTP transmission for retransmission(s) may be used. In an example, PTM transmission scheme 2 for retransmission(s) may be used. In an example, association between PTM scheme 1 and PTP transmitting the same TB may be indicated. In an example, if multiple retransmission schemes are used, different retransmission schemes may be used simultaneously for different UEs in the same group.

In an example, for multicast of RRC-CONNECTED UEs, a common frequency resource for group-common PDCCH/PDSCH may be confined within the frequency resource of a dedicated unicast BWP to support simultaneous reception of unicast and multicast in the same slot.

In an example, the common frequency resource may be defined as an MBS specific BWP, which may be associated with the dedicated unicast BWP and using the same numerology (e.g., SCS and CP). In an example, BWP switching may be needed between the multicast reception in the MBS specific BWP and unicast reception in its associated dedicated BWP.

In an example, the common frequency resource may be defined as an MBS frequency region with a number of contiguous PRBs, which may be configured within the dedicated unicast BWP. In an example, the starting PRB and the length of PRBs of the MBS frequency region may be indicated.

In an example, a UE may be configured with no unicast reception in the common frequency resource.

In an example, more than one common frequency resources per UE/per dedicated unicast BWP may be subject to UE capabilities.

In an example, one unicast PDSCH and one group-common PDSCH may be TDM multiplexed in a slot based on UE capability for RRC_CONNECTED UEs.

In an example, SPS group-common PDSCH may be used for MBS for RRC_CONNECTED UEs.

In an example, group-common PDCCH may be used or UE-specific PDCCH for SPS group-common PDSCH activation/deactivation.

In an example, more than one SPS group-common PDSCH configuration per UE may be used.

In an example, for PTM transmission scheme 1, the CORESET for group-common PDCCH may be configured within the common frequency resource for group-common PDSCH. In an example, a number of CORESET(s) for group-common PDCCH within the common frequency resource for group-common PDSCH may be configurable.

In an example, for search space set of group-common PDCCH of PTM scheme 1 for multicast in RRC_CONNECTED state, the CCE indexes may be common for different UEs in the same MBS group.

In an example, for RRC_CONNECTED UEs, unicast PDSCH and group-common PDSCH may be inter-slot TDM'ed in different slots.

In an example, the following cases for simultaneous reception of unicast PDSCH and group-common PDSCH in a slot based on UE capability for RRC_CONNECTED UEs. In an example, TDM between multiple TDMed unicast PDSCHs and one group-common PDSCH may be used in a slot. In an example, TDM among multiple group-common PDSCHs in a slot may be used. In an example, TDM between multiple TDMed unicast PDSCHs and multiple TDMed group-common PDSCHs in a slot may be used. In an example, FDM between multiple TDMed unicast PDSCHs and multiple TDMed group-common PDSCHs in a slot may be used. In an example, FDM among multiple group-common PDSCHs in a slot may be used.

In an example, for search space set of group-common PDCCH of PTM scheme 1 for multicast in RRC_CONNECTED state: a new search space type specific for multicast may be defined.

In an example, for RRC_CONNECTED UEs receiving multicast, at least for PTM scheme 1, at least one of ACK/NACK based HARQ-ACK feedback for multicast and NACK-only based HARQ-ACK feedback for multicast may be used.

In an example, for ACK/NACK based HARQ-ACK feedback for multicast, from per UE perspective, UE may feedback ACK or NACK. From UEs within the group perspective, PUCCH resource configuration for ACK/NACK feedback may be shared or separate PUCCH resources.

In an example, for NACK-only based HARQ-ACK feedback for multicast, from per UE perspective, UE may only feedback NACK. From UEs within the group perspective, PUCCH resource configuration may be for NACK only feedback.

In an example, ACK/NACK-based or NACK-only based HARQ-ACK feedback may be configurable.

In an example, for RRC_CONNECTED UEs receiving multicast, for ACK/NACK based HARQ-ACK feedback if used for group-common PDCCH scheduling, PUCCH resource configuration for HARQ-ACK feedback from per UE perspective may be shared with PUCCH resource configuration for HARQ-ACK feedback for unicast or may be separate from PUCCH resource configuration for HARQ-ACK feedback for unicast.

In an example, for RRC_CONNECTED UEs receiving multicast, for NACK-only based HARQ-ACK feedback if used for group-common PDCCH scheduling, PUCCH resource configuration for HARQ-ACK feedback from per UE perspective may be separate from PUCCH resource configuration for HARQ-ACK feedback for unicast.

In an example, enabling/disabling HARQ-ACK feedback for MBS may be used, e.g., via DCI, or RRC configuration enabling/disabling, or RRC may configure the enabling/disabling function and DCI may indicate enabling/disabling, or MAC CE may indicate enabling/disabling, or RRC may configure the enabling/disabling function and MAC CE may indicate enabling/disabling.

In an example, for slot-level repetition for group-common PDSCH of RRC_CONNECTED UEs, for indicating the repetition number, DCI may be used, or RRC may be used, or RRC and DCI may be used, or MAC CE may be used, or RRC and MAC CE may be used.

In an example, from the perspective of RRC_CONNECTED UEs receiving multicast, at least for PTM scheme 1 initial transmission, retransmission may be based on a group-common PDCCH scheduled group-common PDSCH, a UE-specific PDCCH scheduled PDSCH (e.g., UE-specific PDSCH or group-common PDSCH). In an example, retransmission may be based on code block group (CBG).

In an example, for ACK/NACK based HARQ-ACK feedback if used, both Type-1 and Type-2 HARQ-ACK codebook may be used for RRC_CONNECTED UEs receiving multicast.

In an example, for RRC_IDLE/RRC_INACTIVE UEs, support group-common PDCCH with CRC scrambled by a common RNTI to schedule a group-common PDSCH, where the scrambling of the group-common PDSCH may be based on the same common RNTI.

In an example, for RRC_IDLE/RRC_INACTIVE UEs, beam sweeping may be used for group-common PDCCH/PDSCH.

In an example, for RRC_IDLE/RRC_INACTIVE UEs, common frequency resource(s) for group-common PDCCH/PDSCH may be defined/configured.

In an example, the UE may assume the initial BWP as the default common frequency resource for group-common PDCCH/PDSCH, if a specific common frequency resource is not configured.

In an example, from physical layer perspective, for broadcast reception, the same group-common PDCCH and the corresponding scheduled group-common PDSCH may be received by both RRC_IDLE/RRC_INACTIVE UEs and RRC_CONNECTED UEs.

In an example, for RRC_IDLE/RRC_INACTIVE UEs, common search space (CSS) may be used for group-common PDCCH.

In an example, for RRC_IDLE/RRC_INACTIVE UEs, a CORESET may be configured within the common frequency resource for group-common PDCCH/PDSCH.

In an example, for RRC_CONNECTED UEs, if ACK/NACK based HARQ-ACK feedback is used for PTM scheme 1, and if initial transmission for multicast is based on PTM transmission scheme 1, retransmission(s) may use PTP transmission. In an example, the HARQ process ID and NDI indicated in DCI may be used to associate the PTM scheme 1 and PTP transmitting the same TB.

In an example, for RRC_CONNECTED UEs, more than one SPS group-common PDSCH configuration for MBS may be configured per UE subject to UE capability.

In an example, for RRC_CONNECTED UEs, HARQ-ACK feedback for SPS group-common PDSCH for MBS may be used.

In an example, the CFR (common frequency resource) for multicast of RRC-CONNECTED UEs, which may be confined within the frequency resource of a dedicated unicast BWP and using the same numerology (SCS and CP), may include the following configurations: starting PRB and the number of PRBs, one PDSCH-config for MBS (e.g., separate from the PDSCH-Config of the dedicated unicast BWP), one PDCCH-config for MBS (e.g., separate from the PDCCH-Config of the dedicated unicast BWP), SPS-config(s) for MBS (e.g., separate from the SPS-Config of the dedicated unicast BWP).

In an example, for search space set of group-common PDCCH of PTM scheme 1 for multicast in RRC_CONNECTED state, at least CSS may be used.

In an example, for activation/deactivation of SPS group-common PDSCH for MBS in RRC_CONNECTED state, at least group-common PDCCH may be used.

In an example, for ACK/NACK based feedback if used for RRC_CONNECTED UEs receiving multicast, UE may be optionally configured a separate PUCCH-Config for multicast. Otherwise, PUCCH-Config for unicast may apply.

In an example, the priority for HARQ-ACK feedback for RRC_CONNECTED UE receiving multicast may be, lower, higher than or equal to the HARQ-ACK feedback for unicast.

In an example, for RRC_CONNECTED UEs receiving multicast, ACK/NACK based HARQ-ACK feedback for multicast may be used and NACK-only based HARQ-ACK feedback for multicast may be used.

In an example, for the cases of HARQ-ACK feedback (at least for ACK/NACK based feedback) is available for multicast and unicast for a given UE receiving multicast, for determining the PUCCH resource, multiplexing for the same priority and prioritizing for different priorities at least when the corresponding PUCCH resources overlap in time in a slot may be used.

In an example, for ACK/NACK based feedback if used for multicast, construction of Type-1 HARQ-ACK codebook based on the union of the PDSCH TDRA sets of the unicast service and the multicast service (if they are separately configured), at least of the same priority, may be used.

In an example, slot-level repetition for group-common PDSCH for RRC_CONNECTED UEs receiving multicast may be used.

In an example, for enabling/disabling HARQ-ACK feedback for RRC_CONNECTED UE receiving multicast, RRC signaling may configure the enabling/disabling function of DCI indicating the enabling/disabling HARQ-ACK feedback. In an example, DCI may indicate (explicitly or implicitly) whether HARQ-ACK feedback is enabled/disabled. In an example, enabling/disabling may be by MAC CE.

In an example, for RRC_IDLE/RRC_INACTIVE UEs, one common frequency resource for group-common PDCCH/PDSCH may be defined/configured.

In an example, for RRC_IDLE/RRC_INACTIVE UEs, for broadcast reception, the UE may assume that group-common PDCCH/PDSCH is QCL'd with SSB.

In an example, for broadcast reception, the same group-common PDCCH and the corresponding scheduled group-common PDSCH may be received by both RRC_IDLE/RRC_INACTIVE UEs and RRC_CONNECTED UEs when UE-specific active BWP of RRC_CONNECTED UE contains the common frequency resource of RRC_IDLE/INACTIVE UEs and the SCS and CP are the same.

In an example, two modes may be available for MBS, one delivery mode for high QoS (reliability, latency) requirement, to be available in RRC CONNECTED state and one delivery mode for "low" QoS requirement may be available where the UE may also receive data in INACTIVE/IDLE state. In an example, delivery mode 1 may be used only for multicast sessions. In an example, delivery mode 2 may be used for broadcast sessions. In an example, mode 2 may be available for multicast sessions. In an example, when there is no data ongoing for the multicast session, the UE may stay in RRC_CONNECTED. In general, information of MBS services/groups subscribed by the UE (e.g., TMGI) and QOS requirements of an MBS service may be provided to RAN.

In an example, the function of mapping from QoS flows to MBS RBs in SDAP may be needed for NR MBS.

In an example, both idle/inactive UEs and connected mode UEs may receive MBS services transmitted by NR MBS delivery mode 2 (e.g., broadcast service). The ability for connected mode UEs to receive this may depend on the network provisioning of the service (e.g., which frequency), UE connected mode configuration and UE capabilities.

In an example, a two-step approach (e.g., BCCH and MCCH) may be used for the transmission of PTM configuration for NR MBS delivery mode 2. In an example, MCCH change notification mechanism may be used to notify the changes of MCCH configuration due to session start for delivery mode 2 of NR MBS. In an example, MBS Interest Indication may be used for UEs in connected mode for Broadcast service. In an example, MBS Interest Indication may NOT be used for UEs in idle/inactive mode for NR MBS delivery mode 2.

In some examples, once a Multicast session is configured, UEs may join that Multicast session (e.g., via NAS SM procedure). When a first Multicast UE joins a Multicast session, such Multicast session may be established between 5GC and RAN. The Multicast session may be either in active or inactive state depending on Multicast data activity. In some examples, when the Multicast session is activated, the 5GC may be expected to notify NAS CM_IDLE/RRC_IDLE state UEs via paging procedure. For CM_CONNECTED/RRC_INACTIVE state UEs, RAN paging may be used to alert the UEs to start receiving Multicast data by resuming RRC connection. To reduce paging overhead, it may be desirable to page multiple UEs using group paging mechanism. Example embodiments may enable MBS group notification and enhanced operation in RRC inactive state.

In some examples, the 5G MBS data sessions may have a wide range of durations and transmission periodicities. Many UEs may also be receiving MBS data without much unicast traffic and signaling during the MBS sessions. Example embodiments may enable power saving for UEs with MBS sessions as the UE may be able to receive 5G MBS in all RRC states.

In the following MBS Configuration may refer to MBS radio bearer and control configuration, e.g., MBS QoS, MCCH/MTCH configuration, SPS configuration, etc.

In some examples, once an MBS service is announced through upper layers, the UE may subscribe to service or join the multicast group to be able to receive the MBS configuration and data. In some examples, such subscription or multicast group joining process may require UE to move to RRC connected state. In some examples in case of multicast, the UE move to RRC Connected state to join the group and obtain MBS configuration.

In some examples, the MBS session may start later than service is announced. While in some cases the start of session may be known and provided to the UE in others the exact start time may be determined closer to data availability in which case the UEs may be notified about the MBS session start. In some examples, an MBS notification may be used to inform users is different RRC states about start of an upcoming MBS session.

In some examples, while some of MBS configuration may be provided at the time of MBS join/subscription, there may be element of MBS configuration which may be determined closer to data transmission or changed during an MBS session. In some examples, an MBS notification may be used for UE in different RRC states to obtain the MBS configuration or a change in MBS configuration. In some examples, the MBS notifications may be sent as UE specific signalling or group signalling.

In some examples, the number of UEs in the MBS group may be large and MBS notification information may be common for all member UEs. In some examples, the UE specific signalling may not be scalable and efficient in most cases.

Figure 16:
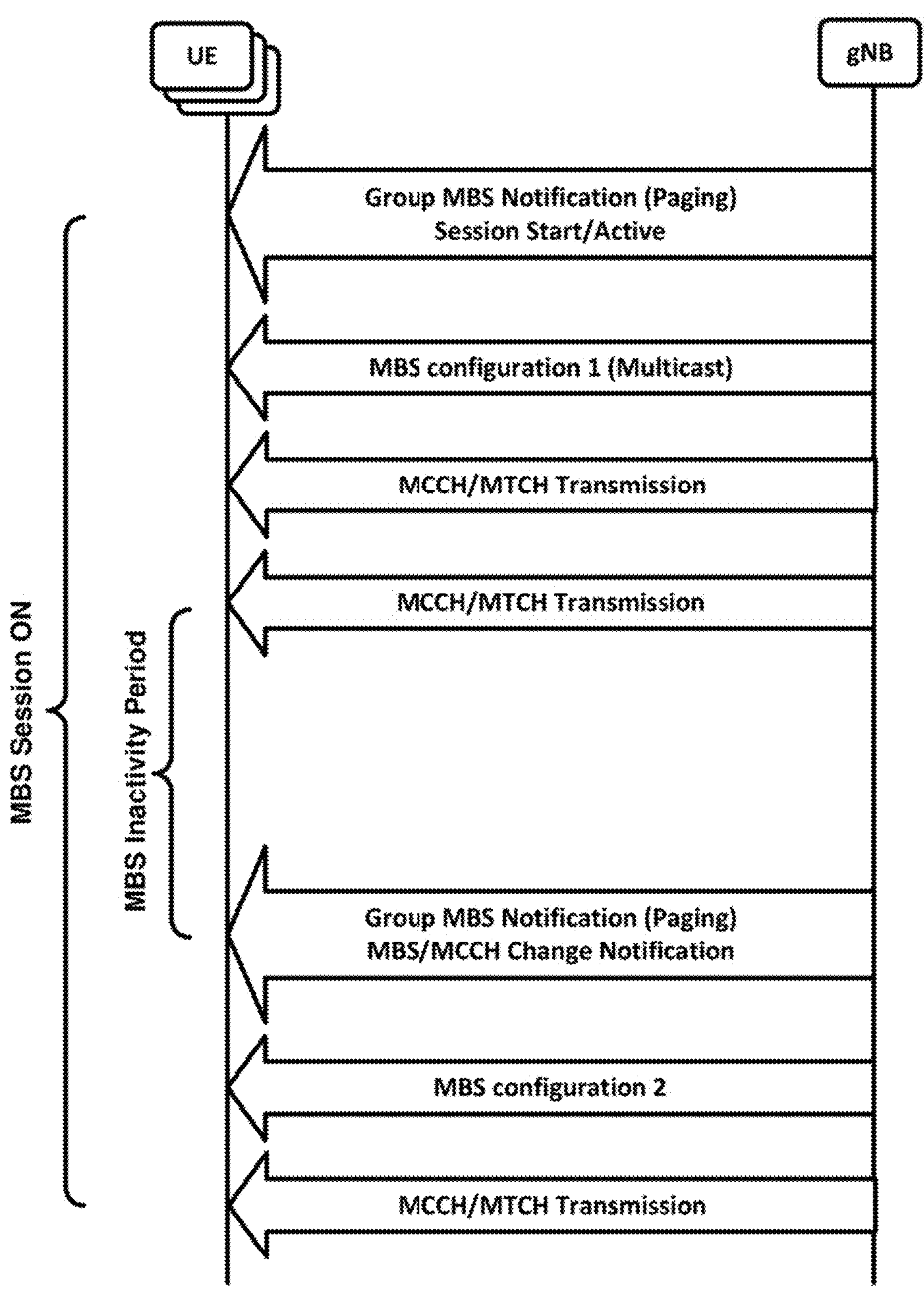
FIG. 16 shows an example MBS group notification/paging for session start/end or MBS configuration change according to some aspects of some of various exemplary embodiments of the present disclosure.

In some examples, to deliver such MS notification to UEs in all RRC states, paging based notification may be used. UE is in RRC connected, inactive and idle states may be able to monitor the paging occasions to obtain this notification information. The MBS notification may be use by core network or the RAN to reach UEs in all states and provide notifications relate to session start/end or MBS configuration changes. In some examples, group Paging may be more efficient than UE specific paging for MBS related notifications. In some examples, group Paging may be used to notify UEs for MBS session start/end or activation/deactivation. In some example, group paging may be used during an active MBS session to notify UEs about any changes to MBS configuration, e.g., MCCH change or SPS configuration change. FIG. 16, shows example MBS Group Notifications/Paging for Session Start or MBS Configuration Change.

In some examples, an MBS user may be in idle or inactive mode after initial MBS session activation. For example, the UE may have joined a multicast session which may start later, and the UE may be released to idle or inactive mode due to (unicast) data inactivity. Another example is when a multicast session has started, but the session is deactivated due to inactivity in one MBS data for a configurable period and the UE may be released to idle/inactive due to inactivity in RAN. In some examples, MBS data transmission may be periodic or aperiodic and may involve long duration of inactivates between MBS transmission burst within a session. In some examples, MBS users may transition to idle or inactive state during an MBS session as determined by the network to release network resources during congestion and/or improve UEs' power saving.

In some examples, upon receiving the MBS notification based on type of service and notification the UE may be directed to move to connected state to receive MBS configuration and data. In some examples, when MBS configuration is not changed the UE may be directed to stay in power saving states, inactive or idle, and keep receiving MBS data based on previously received MBS configuration.

In some examples, UE's RRC context may be maintained by the RAN during RRC inactive state. In some examples, for multicast services with stricter QoS and service continuity requirements, the UE may use RRC inactive states for power saving compared to idle state. In some examples, for multicast services with higher QoS requirement for which the RAN and UE may maintain the MBS RRC context the UEs may only move to inactive state for power saving as determined by the network.

The main different between MBS users in connected vs inactive states may be their involvement in downlink control channel, e.g., PDCCH, monitoring and uplink control channel signalling, e.g., HARQ and CSI feedback.

For UEs with robust channel condition the uplink feedback to RAN may not be needed as they may not change the transmission attribute of MBS data, e.g., MCS level or re-transmission, etc. For such UEs a move to inactive state may not impact the QoS or reliability of their MBS reception. In some examples, UEs involved in MBS reception only and with robust channel conditions, e.g., high RSRP/RSRQ, as configured by the RAN may transition inactive state as triggered by UE or the RAN.

In some examples, for MBS users in inactive state with robust channel conditions may be configured not to reply to an MBS notification, e.g., group MBS paging, when their channel robustness conditions meet a criterion set by the network.

In some examples, the UE may need valid MBS Configuration before receiving the MBS data. If MBS configuration is provided through common/group signaling, the UE may obtain such information without transitioning to RRC connected state. In some examples, for example if MBS configuration is provided through dedicated signaling, the UE may transition to RRC connected state to obtain the MBS configuration before it can receive MBS data. In some examples, the MBS notification may include a timer or index to show if previously received MBS configuration is applicable or has changed. In case of no change, the UE may skip obtaining MBS configuration and reuse the stored configuration.

Figure 17:
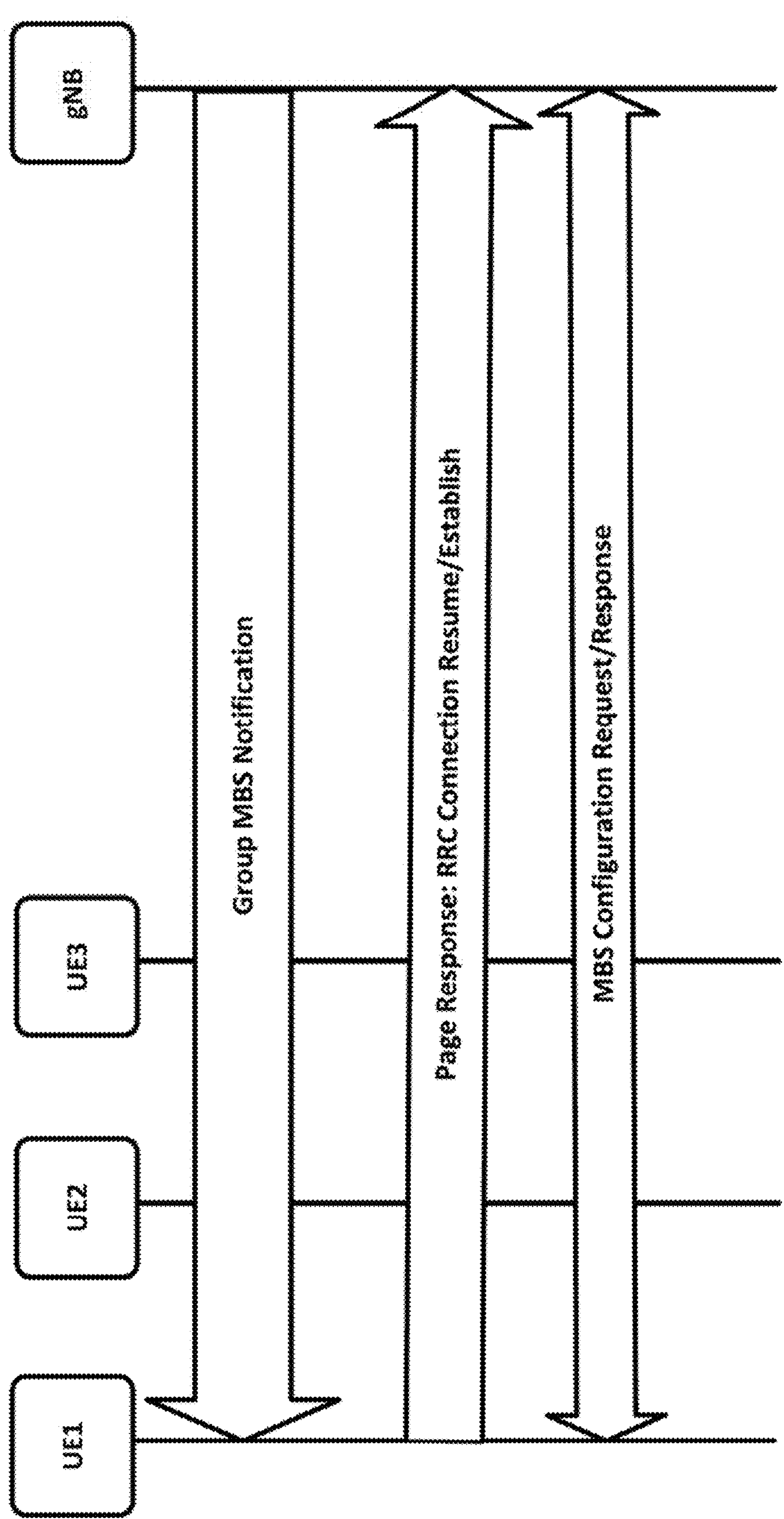
FIG. 17 shows an example channel robustness-based group page response and selective MBS configuration according to some aspects of some of various exemplary embodiments of the present disclosure.

For example, as shown in FIG. 17, UE2 and UE3 may not reply to page as they meet the MBS channel robustness requirement set by the network but UE3 may send page response and may need to obtain MBS configuration if not current.

In some examples, MBS configuration may have a time index or version number such that UEs receiving an MBS notification may determine if their last received version is current or not.

Figure 18:
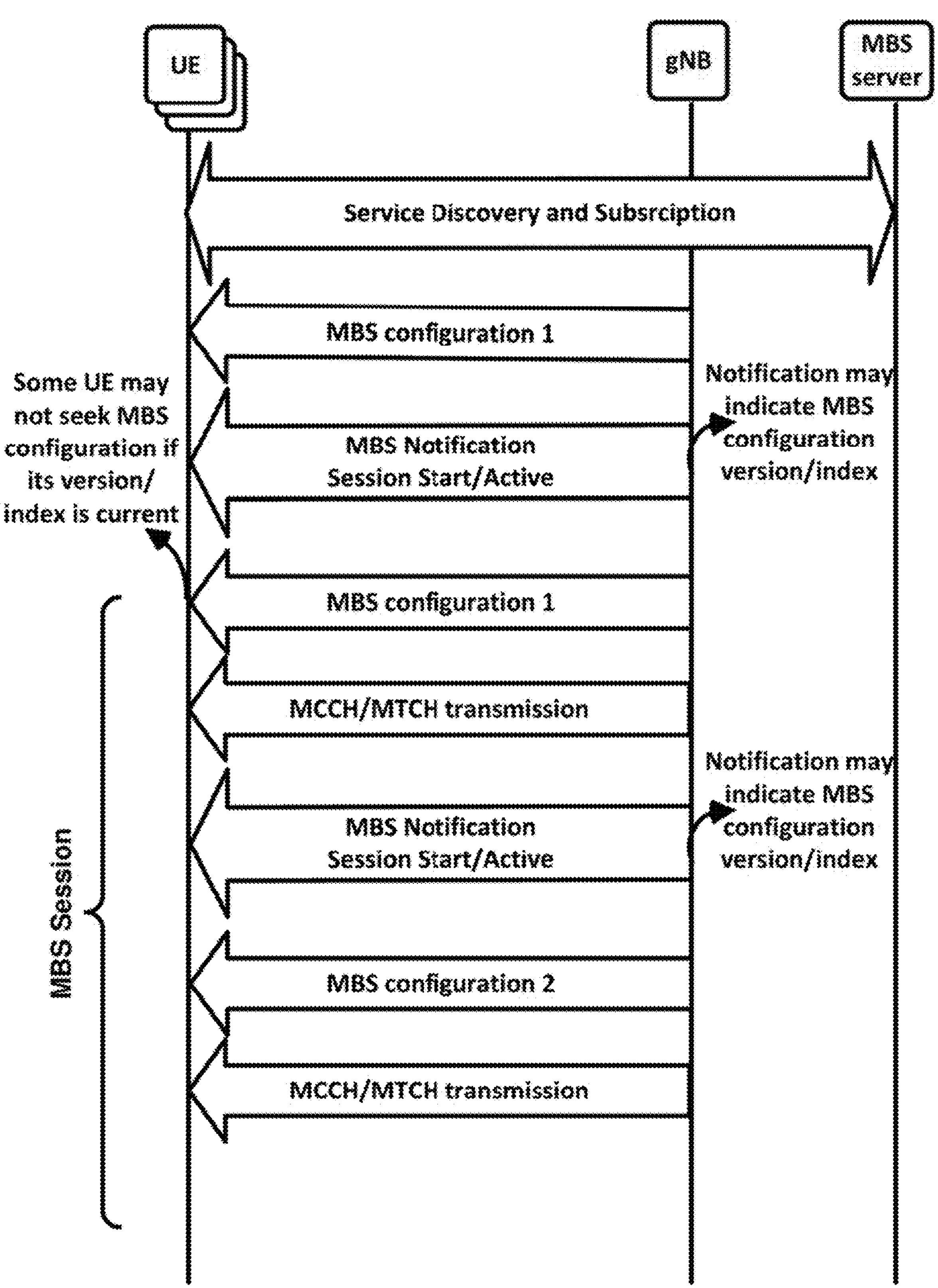
FIG. 18 shows an example process according to some aspects of some of various exemplary embodiments of the present disclosure.

In some examples, the MBS notification may have information to direct UEs to reuse previous MBS configuration, using a version number or index, or obtain new MBS configuration through common or dedicated signaling. An example is shown in FIG. 18.

In some examples, the MBS configuration may be the same across a set of nearby cells or sectors. In this case RAN may configure such set of cells as a RAN Notification Area (RNA) for MBS such that inactive UE moving within such MBS-RNA may receive MBS data without returning to connected mode. UEs in inactive state may resume their connection in the same or different cells within the same RNA reusing the same MBS context and configuration. In some examples, RAN may reuse the RNA concept to define MBS zone with common configuration within which inactive UEs may move and maintain their MBS reception without returning to connected state. In some examples, in cell reselection in inactive state, the MBS users may set a higher priority for gNBs which are part the common MBS zone of RNA. In some examples, when UE in active state reselects a cell with a different MBS RNA, it may transition to RRC connected state to obtain the locally valid MBS configuration.

Multicast broadcast services (MBS) are provided in different radio resource control (RRC) states including RRC inactive state. Existing solutions for MBS operation in inactive state may require frequent transitions of UEs to RRC connected state, for example for reception of MBS change notifications, MBS start/end timing of MBS sessions and/or MBS configurations. Such frequent transitions may put burden on the system RACH capacity and degrade wireless device and network performance. Example embodiments enhance MBS notification and operation in RRC inactive state.

Figure 19:
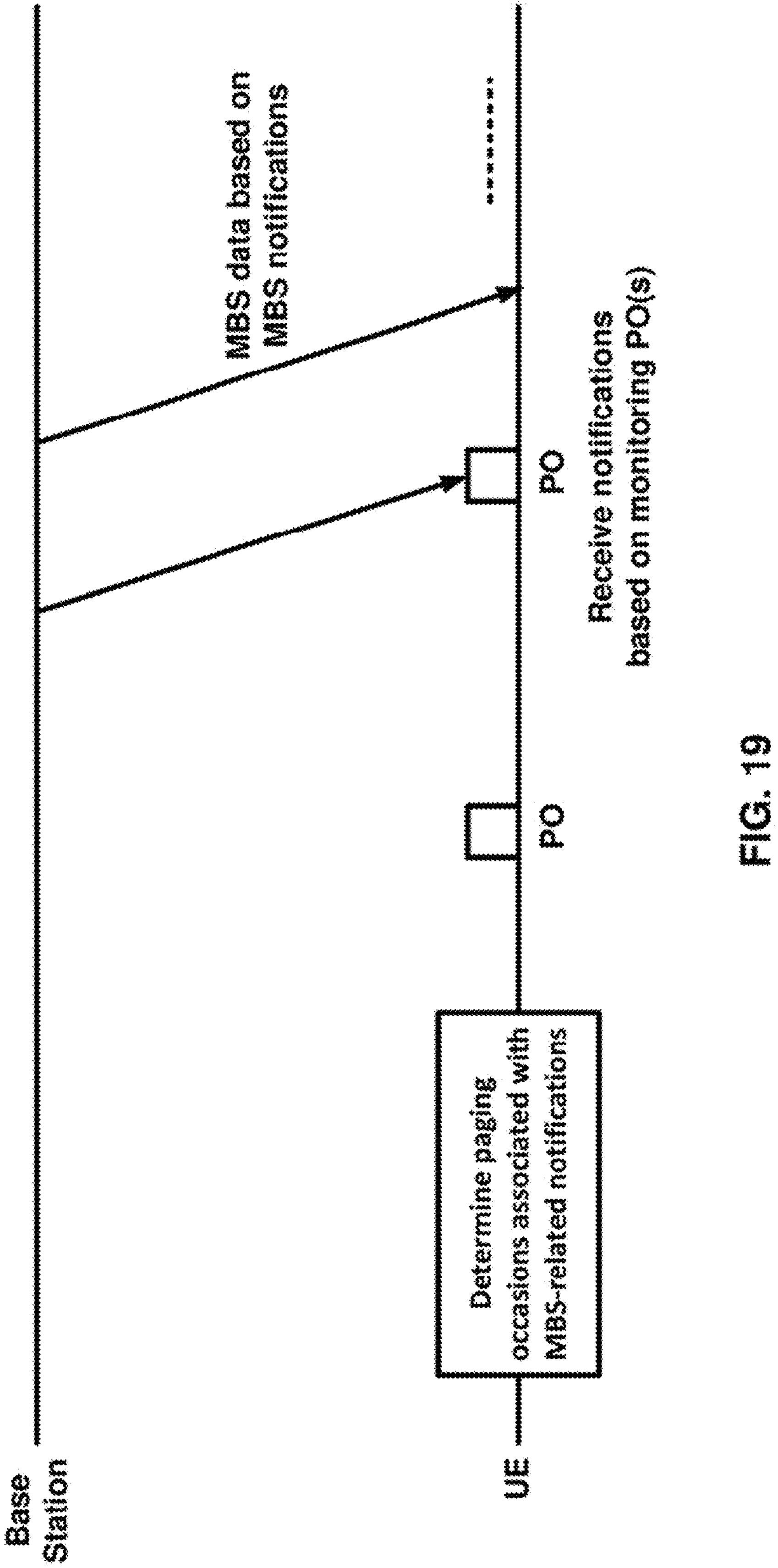
FIG. 19 shows an example process according to some aspects of some of various exemplary embodiments of the present disclosure.

In an example embodiment as shown in FIG. 19, a user equipment (UE) may determine paging occasions for monitoring control channel. For example, the determination of the paging occasions may be based on a DRX procedure.

The UE may determine the paging occasions based on performing the DRX procedure and using the DRX parameters. For example, the determination of the paging occasions may be based on a UE ID (e.g., a TMSI associated with the UE), one or more offset parameters (e.g., determined based on an RRC message or a broadcast message), etc. The monitoring of the control channel may be for receiving downlink control information comprising scheduling information of a paging transport block, e.g., via a paging channel (e.g., PCCH). The downlink control information on the downlink control channel may be addressed to a paging RNTI (P-RNTI). The UE may receive a configuration parameter (e.g., via an RRC message or a broadcast message) indicating the P-RNTI. The paging transport block may comprise one or more paging messages. The one or more paging messages may comprise one or more MBS-related notifications. The UE may monitor the downlink control channel in one or more first paging occasions of the paging occasions determined by the UE. The UE may receive MBS data based on the one or more MBS related notifications.

In some examples, the one or more MBS related notifications may indicate a start time or an activation time of one or more MBS sessions and/or a stop time or deactivation time of one or more MBS sessions. The reception of the MBS data may be based on the start time or the activation time of the one or more MBS sessions and/or the stop time or deactivation time of the one or more MBS sessions that may be indicated by the one or more MBS-related notifications.

In some examples, the one or more MBS related notifications may indicate one or more MBS configuration parameters for reception of the MBS data. For example, the one or more MBS configuration parameters may comprise parameters of a multicast control channel, parameters of one or more semi-persistent scheduling (SPS) configurations (e.g., periodicity, parameters for determining SPS resources, etc.) used for reception of MBS data, etc. The UE may receive the MBS data based on the one or more MBS configuration parameters. In some examples, the one or more MBS related notifications may indicate a change in the MBS configuration parameters, for example, a change in the multicast control channel configuration parameters or a change in the SPS configuration parameters (e.g., a change in SPS periodicity, etc.). The UE may determine the change in the MBS configuration parameters based on the one or more MBS related notifications. For example, the one or more MBS related notifications may comprise a version number or an index of the MBS configuration and the UE may determine that the MBS configuration has changed based on a change in the version number or index of the MBS configuration compared to a current/existing version number or index.

The UE may be in one of a plurality of RRC states (e.g., RRC connected state, RRC idle state or RRC inactive state). In some examples and incase the UE is in the RRC idle state, the paging may be a core network (CN)-initiated paging. In some examples and in case the UE is in the RRC inactive state, the paging may be a radio access network (RAN)-initiated paging. In some examples, and in case the UE is in the RRC inactive state, the paging may be performed in an RAN notification area (RNA) that may comprise one or more cells and was assigned to the UE when it was ordered to enter the inactive state (e.g., via an RRC release message).

In some examples, the paging may be a group paging and may be destined to a group of UEs (e.g., group of UEs interested in one or more MBS sessions, for example, those UEs that might be scheduled to receive MBS data) comprising the UE. For example, the UE may determine the paging occasions associated with the group of UEs, to which the UE belongs, and may monitor the paging occasions associated with the group of the UEs. In some examples, the UE may determine that the paging message is associated with the group of UEs based on a group ID included in the paging message.

In some examples, in response to reception of the one or more MBS related notifications (e.g., as indicated by the one or more paging messages), the UE may perform a state transition. For example, the UE may be in an RRC idle/inactive state and the UE may transition to the RRC connected state (e.g., using an RRC resume procedure or an RRC establishment procedure) in response to reception of the one or more MBS related notifications. In some examples, the UE may perform a state transition in response to the reception of the one or more MBS related notifications based on one or more channel robustness conditions (e.g., RSRP or RSRQ of one or more reference signals). In some examples, the UE may perform the state transition based on whether the one or more MBS related notifications indicate a change in the MBS configuration (for example based on a version number or an index) of the MBS configuration. In some examples, the UE may determine (e.g., based on the one or more MBS related notifications indicating a version number or an index associated with the MBS configuration) that the MBS configuration has changed, and the UE may perform the state transition in response to this determination. In some examples, the UE may obtain new MBS configuration based on this state transition and may receive the MBS data using the new MBS configuration.

Figure 20:
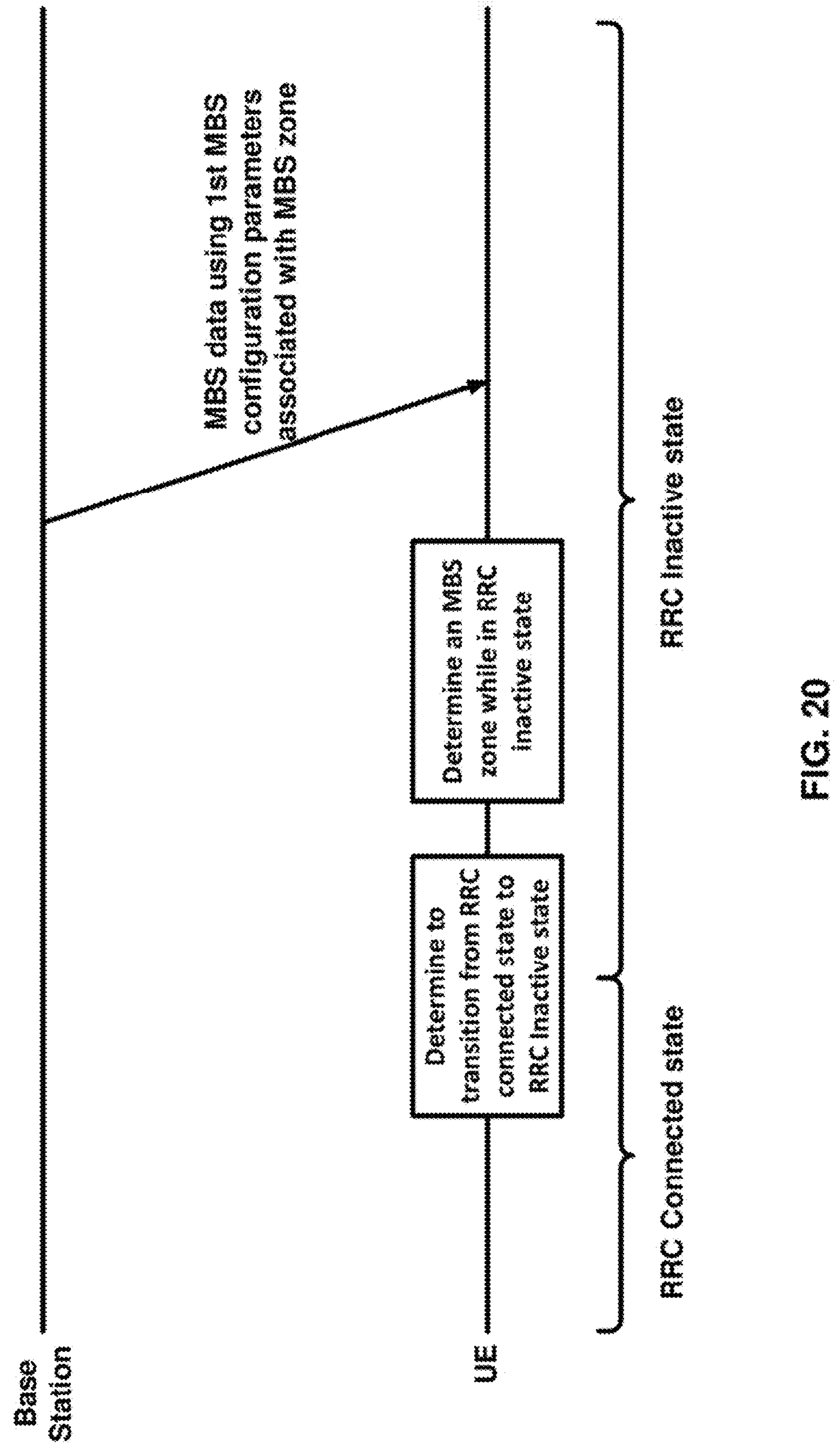
FIG. 20 shows an example process according to some aspects of some of various exemplary embodiments of the present disclosure.

In an example embodiment as shown in FIG. 20, a UE may determine to transition from an RRC connected state to an RRC inactive state. For example, the UE may receive an RRC release message comprising a suspend config IE indicating transitioning command from the RRC connected state to the RRC inactive state. The UE may determine an MBS zone associated with MBS data reception (e.g., MBS data reception in the RRC inactive state). For example, the MBS zone may be for/associated with one or more cells and/or RAN notification areas (RNAs) and/or tracking areas (TAs). In some examples, the UE may determine the MBS zone based on one or more IEs/parameters indicated by an RRC release message (e.g., a suspend config of the RRC release message). The one or more IEs/parameters indicating the MBS zone may indicate identifiers associated with the cell(s)/RNA(s)/TA(s) of the MBS zone. The UE may receive MBS data, while within the MBS zone using first configuration parameters. In some examples (e.g., while the UE is in RRC inactive state), the MBS configuration parameters may be MBS zone-specific, and the first configuration parameters may be for the MBS zone in which the UE currently resides.

Figure 21:
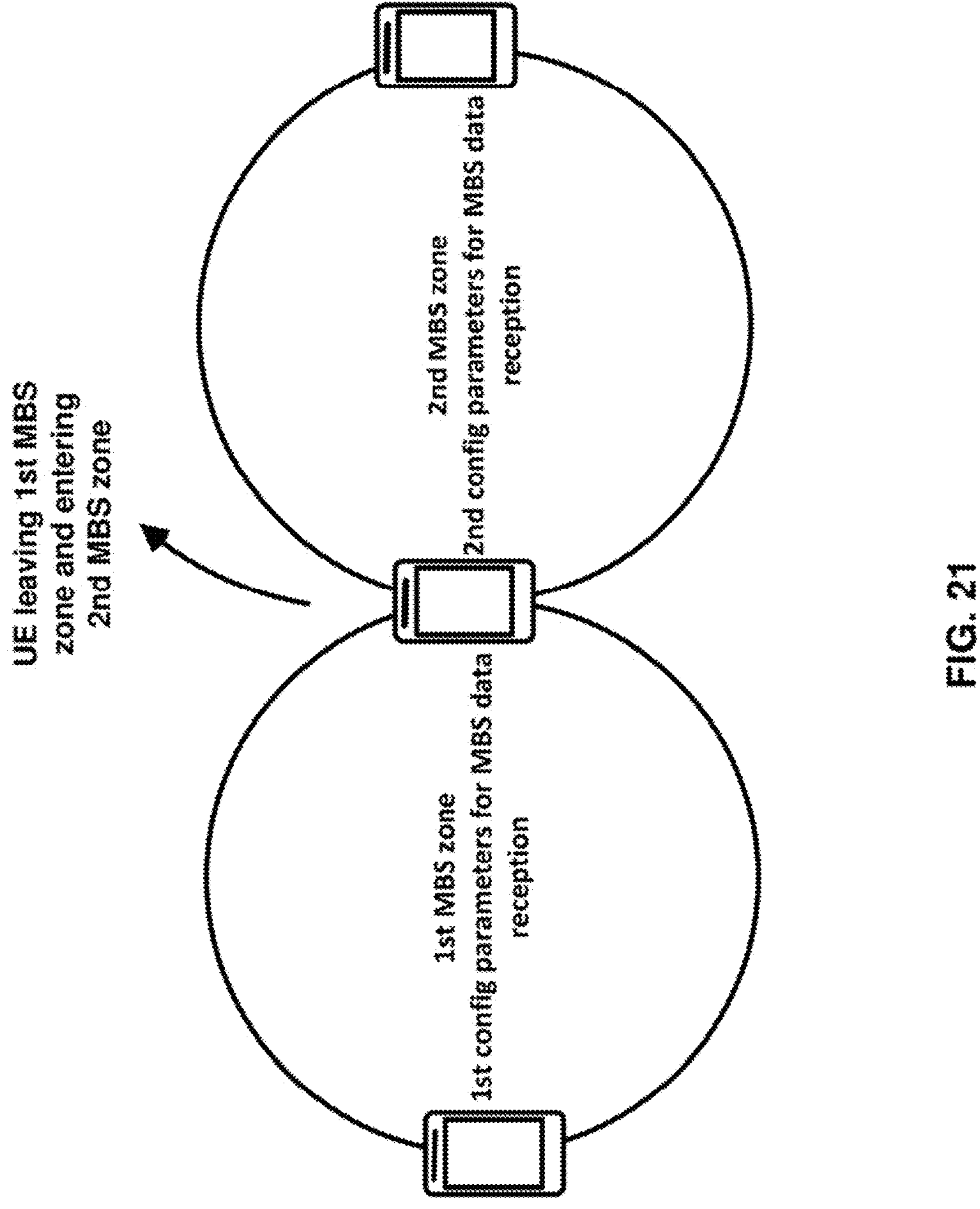
FIG. 21 shows an example MBS zone-based MBS data reception according to some aspects of some of various exemplary embodiments of the present disclosure.

In some examples as shown in FIG. 21, the UE may reselect a cell based on a cell reselection procedure while in the RRC inactive state. In response to the cell reselection and camping on the cell and if the cell reselection results in changing the MBS zone, e.g., if the reselected cell is not within the current MBS zone, the UE may perform a state transition, e.g., based on a random access process. The UE may receive new MBS configuration parameters for a new MBS zone in which the new reselected zone belongs to.

In an example embodiment, a user equipment (UE) may determine paging occasions for monitoring a downlink control channel associated with one or more paging messages comprising one or more MBS-related notifications. The UE may receive the one or more MBS-related notifications based on monitoring the control channel in one or more first paging occasions of the paging occasions. The UE may receive MBS data based on the one or more MBS-related notifications.

In some examples, the one or more multicast broadcast services (MBS)-related notifications may indicate a start time or an end time or an activation time or deactivation time of an MBS session.

In some examples, the one or more multicast broadcast services (MBS)-related notifications may indicate one or more MBS configuration parameters for reception of the MBS data.

In some examples, the one or more multicast broadcast services (MBS) configuration parameters may comprise semi-persistent scheduling (SPS) configuration parameters.

In some examples, the one or more multicast broadcast services (MBS)-related notifications may indicate a change in MBS configuration. In some examples, the change in multicast broadcast services (MBS) configuration comprise one or more of a change in multicast control channel (MCCH) configuration or a change in semi-persistent scheduling (SPS) configuration for MBS data reception. In some examples, the one or more multicast broadcast services (MBS)-related notifications may comprise a version number or index associated with MBS configuration. The change in MBS configuration may be based on a change in the version number or index. In some examples, the UE may determine the change in the multicast broadcast services (MBS) based on the version number or the index.

In some examples, the user equipment (UE) may be in a radio resource control (RRC) connected state.

In some examples, the user equipment (UE) may be in a radio resource control (RRC) idle state. In some examples, the one or more paging messages may be receives based on a core network (CN) initiated paging.

In some examples, the user equipment (UE) may be in a radio resource control (RRC) inactive state. In some examples, the one or more paging messages may be receives based on a radio access network (RAN) initiated paging.

In some examples, the UE may receive a configuration parameter indicating a paging radio network temporary identifier (P-RNTI), wherein the downlink control channel may be associated with the P-RNTI.

In some examples, receiving the one or more paging messages may be based on group paging. In some examples, the one or more paging messages may be received by one or more further user equipments (UEs), that may be interested in reception of multicast broadcast services (MBS) data, for example, UEs that might be scheduled to receive MBS data.

In some examples, determining the paging occasions may be based on a discontinuous reception (DRX) procedure. In some examples, determining the paging occasions may be based on a user equipment (UE) identifier. In some examples, the user equipment (UE) identifier may be a temporary mobile subscriber identity (TMSI).

In some examples, determining the paging occasions may be based on an offset parameter received via a radio resource control (RRC) message or via a broadcast message.

In some examples, the UE may initiate a state transition in response to reception of the one or more MBS related notifications. In some examples, the state transition may comprise transitioning from a radio resource control (RRC) inactive state or RRC idle state to an RRC connected state. In some examples, the initiating a state transition may be based on one or more channel robustness conditions. In some examples, the one or more channel robustness conditions may be based on a received signal received power (RSRP) or a received signal received quality (RSRQ) associated with one or more reference signals. In some examples, the state transition may be based on a radio resource control (RRC) connection resume procedure or an RRC connection establishment procedure. In some examples, the one or more multicast broadcast services (MBS)-related notifications may comprise a version number or index of MBS configuration. Initiating the state transition may be based on the version number or the index. In some examples, initiating the state transition may be based on the version number or the index changing compared to a current version number or index.

In an example embodiment, a user equipment (UE) may determine to transition from a radio resource control (RRC) connected state to an RRC inactive state. The UE may determine an MBS zone associated with MBS data reception in an RRC inactive state. The UE may receive the MBS data, using first MBS configuration parameters, while the UE is in the MBS zone.

In some examples, the MBS zone may comprise one or more radio access network (RAN) notification areas (RNAs).

In some examples, the UE may receive a radio resource control (RRC) release message, wherein the determining to transition from the RRC connected state to the RRC inactive state may be based on the RRC release message. In some examples, the RRC release message may comprise one or more information elements (IEs) indicating parameters associated with the multicast broadcast services (MBS) zone. In some examples, the one or more information elements (IEs) may indicate identifiers of one or more cells or one or more radio access network (RAN) notification areas (RNAs) associated with the multicast broadcast services (MBS) zone.

In some examples, the UE may transition from the radio resource control (RRC) inactive state to the RRC connected state in response to reselecting a cell that is not in the multicast broadcast services (MBS) zone. In some examples, the UE may receive second multicast broadcast services (MBS) configuration parameters for MBS data reception in response to the transitioning from the RRC inactive state to the RRC connected state. In some examples, the transitioning from the radio resource control (RRC) inactive state to the RRC connected state may be based on a random access process.

In some examples, the first configuration parameters may be associated with the MBS zone. In some examples, the UE may receive a radio resource control (RRC) release message comprising the first configuration parameters associated with the MBS zone.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method for a user equipment (UE), comprising:

receiving one or more paging messages based on monitoring a downlink control channel, the one or more paging messages including one or more multicast broadcast services (MBS)-related notifications, the one or more MBS-related notifications including an identifier, the one or more paging messages being indicated via downlink control information with a paging radio network temporary identifier (P-RNTI) on the downlink control channel, and the P-RNTI being shared for multiple UEs, including the UE that joined an MBS session;

determining, based on the identifier, that the one or more paging messages are associated with the UE;

performing a Radio Resource Control (RRC) state transition from an RRC idle state or an RRC inactive state to an RRC connected state based on the determining;

receiving one or more MBS configuration information associated with the one or more MBS-related notifications in association with the RRC state transition; and receiving MBS data based on the one or more MBS configuration information.

2. The method of claim 1, wherein the one or more MBS-related notifications indicate a start time or an end time or an activation time or deactivation time of the MBS session.

3. The method of claim 1, wherein the one or more MBS-related notifications indicate a change in the MBS configuration information.

4. The method of claim 1, wherein the one or more paging messages are based on group paging.

5. The method of claim 4, wherein the one or more paging messages are received by one or more UEs including the UE, and the one or more UEs are interested in receiving the MBS data.

6. The method of claim 1, further comprising:

monitoring paging occasions for the downlink control channel associated with the one or more paging messages.

7. The method of claim 6, wherein determining the paging occasions is based on a UE identifier.

8. The method of claim 6, wherein determining the paging occasions is based on a discontinuous reception (DRX) procedure.

9. A user equipment (UE) comprising one or more processors configured to:

receive one or more paging messages based on monitoring a downlink control channel, the one or more paging messages including one or more multicast broadcast services (MBS)-related notifications, the one or more MBS-related notifications including an identifier, the one or more paging messages being indicated via downlink control information with a paging radio network temporary identifier (P-RNTI) on the downlink control channel, and the P-RNTI being shared for multiple UEs, including the UE that joined an MBS session;

determine, based on the identifier, that the one or more paging messages are associated with the UE;

perform a Radio Resource Control (RRC) state transition from an RRC idle state or an RRC inactive state to an RRC connected state based on the determining;

receive one or more MBS configuration information associated with the one or more MBS-related notifications in association with the RRC state transition; and receive MBS data based on the one or more MBS configuration information.

10. A node comprising one or more processors configured to:

transmit one or more paging messages, the one or more paging messages including one or more multicast broadcast services (MBS)-related notifications, the one or more MBS-related notifications including an identifier, the identifier being used for a user equipment (UE) to determine that the one or more paging messages are associated with the UE for performing a Radio Resource Control (RRC) state transition from an RRC idle state or an RRC inactive state to an RRC connected state, the one or more paging messages are indicated via downlink control information with a paging radio network temporary identifier (P-RNTI) on a downlink control channel, and the P-RNTI is shared for multiple UEs, including the UE that joined an MBS session;

transmit one or more MBS configuration information associated with the one or more MBS-related notifications in association with the RRC state transition; and transmit MBS data based on the one or more MBS configuration information.

11. A method for a node, comprising:

transmitting one or more paging messages, the one or more paging messages including one or more multicast broadcast services (MBS)-related notifications, the one or more MBS-related notifications including an identifier, the identifier being used for a user equipment (UE) to determine that the one or more paging messages are associated with the UE for performing a Radio Resource Control (RRC) state transition from an RRC idle state or an RRC inactive state to an RRC connected state, the one or more paging messages are indicated via downlink control information with a paging radio network temporary identifier (P-RNTI) on a downlink control channel, and the P-RNTI is shared for multiple UEs, including the UE that joined an MBS session;

transmitting one or more MBS configuration information associated with the one or more MBS-related notifications in association with the RRC state transition; and transmitting MBS data based on the one or more MBS configuration information.

* * * * *